United States Patent
Tamura

(10) Patent No.: US 10,637,315 B2
(45) Date of Patent: Apr. 28, 2020

(54) STATOR FOR ROTATING ELECTRIC MACHINE

(71) Applicant: DENSO CORPORATION, Kariya, Aichi-pref. (JP)

(72) Inventor: Akito Tamura, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 16/299,628

(22) Filed: Mar. 12, 2019

(65) Prior Publication Data

US 2019/0207454 A1    Jul. 4, 2019

Related U.S. Application Data

(62) Division of application No. 15/225,305, filed on Aug. 1, 2016, now Pat. No. 10,491,070.

(30) Foreign Application Priority Data

Jul. 31, 2015    (JP) ................................ 2015-152831

(51) Int. Cl.
    *H02K 3/12*      (2006.01)
    *H02K 3/52*      (2006.01)
    (Continued)

(52) U.S. Cl.
    CPC ................. *H02K 3/12* (2013.01); *H02K 3/18* (2013.01); *H02K 3/28* (2013.01); *H02K 3/30* (2013.01); *H02K 3/52* (2013.01); *H02K 3/521* (2013.01)

(58) Field of Classification Search
    CPC .. H02K 3/04; H02K 3/28; H02K 3/12; H02K 3/50; H02K 3/52; H02K 3/521;
    (Continued)

(56) References Cited

U.S. PATENT DOCUMENTS

| 5,198,850 A | 3/1993 | Saegusa |
|---|---|---|
| 5,434,637 A | 7/1995 | Ohta |

(Continued)

FOREIGN PATENT DOCUMENTS

| JP | 2006333666 A | * 12/2006 |
|---|---|---|
| JP | 2013-162636 A | 8/2013 |

OTHER PUBLICATIONS

Machine Translation, Kobayashi, JP-2006333666-A, Dec. 2006. (Year: 2006).*

(Continued)

*Primary Examiner* — Thomas Truong
(74) *Attorney, Agent, or Firm* — Oliff PLC

(57) ABSTRACT

A stator includes a stator core having slots, a stator coil comprised of three phase windings, phase busbars each electrically connecting a corresponding one of the phase windings to an inverter, and a neutral busbar star-connecting the phase windings to define a neutral point therebetween. In each of the slots of the stator core, there are arranged K in-slot portions of the phase windings of the stator coil in K layers so as to be radially aligned with each other, where K is an even number. The phase and neutral busbars are electrically connected with those in-slot portions of the phase windings of the stator coil which are arranged at the radially outermost layer or the radially innermost layer in the respective slots of the stator core so as to be circumferentially spaced from one another by M slot-pitches or more, where M is a slot multiplier number.

5 Claims, 24 Drawing Sheets

(51) Int. Cl.
*H02K 3/30* (2006.01)
*H02K 3/18* (2006.01)
*H02K 3/28* (2006.01)

(58) Field of Classification Search
CPC ...... H02K 3/522; H02K 1/16; H02K 2203/06; H02K 2203/09; H02K 3/30
USPC .................. 310/71, 179, 180, 195, 198, 208
See application file for complete search history.

(56) References Cited

U.S. PATENT DOCUMENTS

| | | | |
|---|---|---|---|
| 5,608,488 A | 3/1997 | Hirai et al. | |
| 5,839,002 A | 11/1998 | Miyake et al. | |
| 6,455,972 B1 | 9/2002 | Asao et al. | |
| 2002/0180299 A1* | 12/2002 | Oohashi | H02K 3/28 |
| | | | 310/184 |
| 2008/0199174 A1 | 8/2008 | Yoshida | |
| 2011/0292225 A1 | 12/2011 | Toshiro | |
| 2011/0292238 A1 | 12/2011 | Katsumata | |
| 2013/0076188 A1 | 3/2013 | Ikeda et al. | |
| 2013/0113313 A1* | 5/2013 | Ikura | H02K 3/522 |
| | | | 310/71 |
| 2013/0176480 A1 | 7/2013 | Makigaki | |
| 2015/0097453 A1* | 4/2015 | Nishikawa | H02K 3/50 |
| | | | 310/71 |
| 2015/0188376 A1* | 7/2015 | Yamaguchi | H02K 3/522 |
| | | | 310/71 |
| 2015/0357877 A1* | 12/2015 | Bessho | H02K 5/225 |
| | | | 310/71 |
| 2017/0033630 A1 | 2/2017 | Tamura | |

OTHER PUBLICATIONS

Jan. 10, 2019 Office Action issued in U.S. Appl. No. 15/225,305.
Mar. 28, 2019 Office Action issued in U.S. Appl. No. 15/225,305.

* cited by examiner

ARRANGEMENT OF U1-U5

FIG.17 ARRANGEMENT OF U3
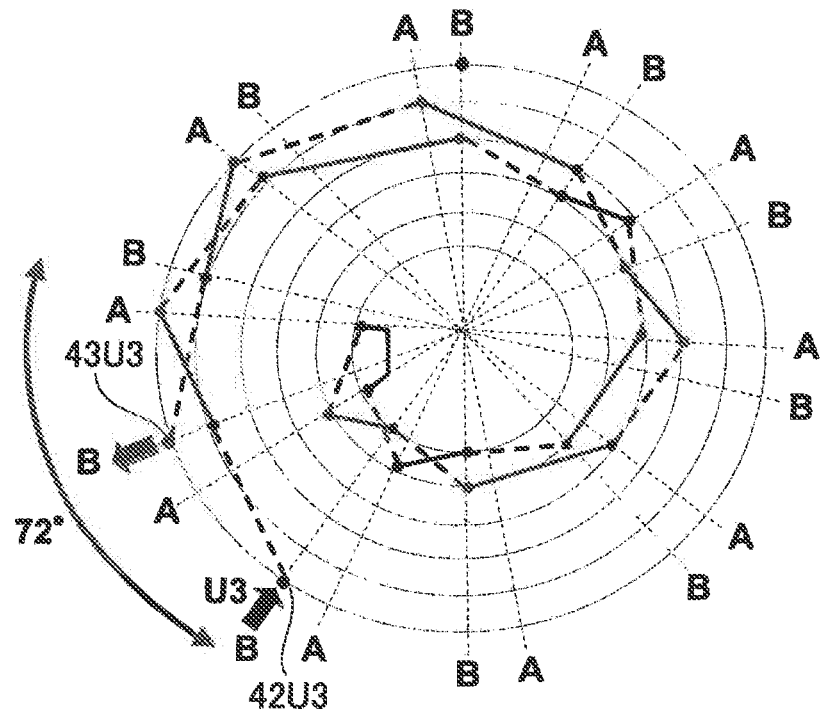
FIG.18 ARRANGEMENT OF U4
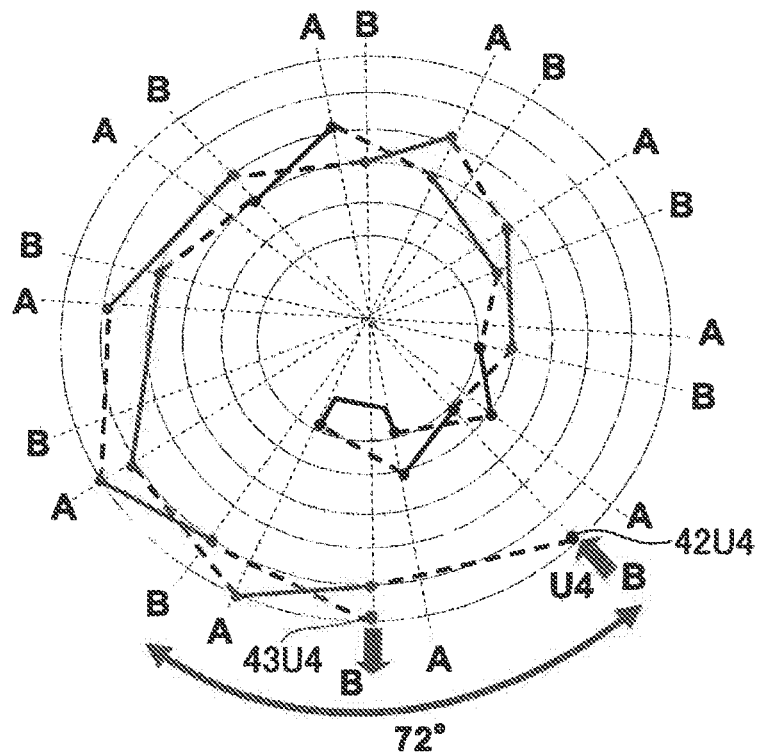

ARRANGEMENT OF U5

FIG.21

|  | U-PHASE SLOTS A | U-PHASE SLOTS B |
|---|---|---|
| 6TH LAYER | 2 | 2 |
| 5TH LAYER | 2 | 2 |
| 4TH LAYER | 2 | 2 |
| 3RD LAYER | 2 | 2 |
| 2ND LAYER | 2 | 2 |
| 1ST LAYER | 2 | 2 |

COOLANT FLOW
FROM ROTOR

STATOR FOR ROTATING ELECTRIC MACHINE

CROSS-REFERENCE TO RELATED APPLICATION

This application is a Divisional of U.S. patent application Ser. No. 15/225,305, filed Aug. 1, 2016, which priority from Japanese Patent Application No. 2015-152831 filed on Jul. 31, 2015, the content of which is hereby incorporated by reference in its entirety into this application.

BACKGROUND

1 Technical Field

The present invention relates to stators for rotating electric machines that are used in, for example, motor vehicles as electric motors and electric generators.

2 Description of Related Art

There are known rotating electric machines that are used in motor vehicles as electric motors and electric generators. These rotating electric machines generally include a rotor and a stator. The rotor is rotatably provided and functions as a field. The stator is disposed in radial opposition to the rotor and functions as an armature.

Japanese Patent Application Publication No. JP2013162636A discloses a stator for a rotating electric machine. The stator is formed by assembling a plurality of stator pieces into an annular shape. Each of the stator pieces includes a coil that is formed by winding an electric conductor wire around a bobbin, and a stator core having teeth to which the coil is mounted. Moreover, in the patent document, there is also disclosed a power distribution component that is designed to reduce the number of types of connection terminals connecting busbars and the coils of the stator, thereby reducing the manufacturing cost.

There are also known two methods of winding a coil on a stator core, namely, concentrated winding and distributed winding. Concentrated winding is a winding method in which the coil is wound so as to be concentrated in one slot of the stator core, as disclosed in the above patent document. On the other hand, distributed winding is a winding method in which the coil is wound so as to be distributed to a plurality of slots of the stator core.

Compared to concentrated winding, distributed winding is more advantageous in terms of torque improvement and noise reduction. However, at the same time, distributed winding has a disadvantage such that the distance between each circumferentially-adjacent pair of the slots of the stator core is short. Therefore, in the case of joining lead wires to power and neutral wires by welding, the distance between each circumferentially-adjacent pair of the resultant welds is accordingly short; the lead wires are led out from a coil end part of a stator coil which protrudes from an axial end face of the stator core. Consequently, creeping discharge may occur between the welds, resulting in insulation failure.

SUMMARY

According to one aspect of the present invention, there is provided a stator for a rotating electric machine. The stator includes an annular stator core, a three-phase stator coil, a plurality of phase connecting members and a neutral connecting member. The stator core has a plurality of slots arranged in a circumferential direction thereof. The stator coil is comprised of three phase windings that are mounted on the stator core so as to be different in electrical phase from each other. Each of the phase windings includes a plurality of in-slot portions each of which is received in one of the slots of the stator core. Each of the phase connecting members is provided to electrically connect a corresponding one of the phase windings of the stator coil to an external electrical device. The neutral connecting member is provided to star-connect the phase windings of the stator coil to define a neutral point therebetween. In each of the slots of the stator core, there are arranged K of the in-slot portions of the phase windings of the stator coil in K layers so as to be radially aligned with each other, where K is an even number. The number of the slots formed in the stator core per magnetic pole of a rotor of the rotating electric machine and per phase of the stator coil is set to M, where M is a natural number greater than or equal to 2. Each of the phase windings of the stator coil is comprised of a plurality of sub-windings that are connected parallel to each other. For each of the sub-windings, the in-slot portion of the sub-winding which is arranged at the Nth layer in one of the slots of the stator core is electrically connected with the in-slot portion of the sub-winding which is arranged at the (N+1)th layer in another one of the slots, where N is a natural number greater than or equal to 1 and less than K. The phase connecting members and the neutral connecting member are electrically connected with those in-slot portions of the phase windings of the stator coil which are arranged at a radially outermost layer or a radially innermost layer in the respective slots of the stator core so as to be circumferentially spaced from one another by M slot-pitches or more.

With the above configuration, it becomes possible to arrange electrical joints formed between the phase and neutral connecting members and the phase windings of the stator coil so as to be circumferentially spaced from one another by M slot-pitches or more. Consequently, it becomes possible to secure sufficient creepage distances between the electrical joints, thereby preventing creeping discharge from occurring therebetween. As a result, it becomes possible to improve the insulation properties of the stator.

According to another aspect of the present invention, there is provided a stator for a rotating electric machine. The stator includes an annular stator core and a stator coil. The stator core has a plurality of slots arranged in a circumferential direction thereof. The stator coil is comprised of a plurality of phase windings that are distributedly wound on the stator core. Each of the phase windings includes a plurality of in-slot portions each of which is received in one of the slots of the stator core. The stator coil has an annular coil end part protruding from an axial end face of the stator core. There are electrical joints formed for making electrical connection of the stator coil and covered by an electrically-insulative resin covering member. The electrical joints are located axially outside the coil end part of the stator coil. The stator coil includes a plurality of bridging wires each of which electrically connects one pair of the in-slot portions of the phase windings of the stator coil respectively received in two different ones of the slots of the stator core. The bridging wires are located axially outside the coil end part of the stator coil and radially inside the electrical joints. Each of the bridging wires has a pair of axially-extending portions and a circumferentially-extending portion between the pair of axially-extending portions. The bridging wires are arranged so that the circumferentially-extending portions of the bridging wires overlap one another over an entire circumferential range of the coil end part of the stator coil.

With the above arrangement, during rotation of a rotor of the rotating electric machine, cooling air (or coolant) that flows in the centrifugal direction of the rotor is blocked by the bridging wires; thus, the electrical joints are prevented from being directly exposed to the flow of the cooling air. Consequently, it becomes possible to reduce thermal stress induced by uneven temperature in the electrical joints, thereby preventing breakage of the electrical joints. As a result, it becomes possible to improve the insulation properties of the stator.

According to yet another aspect of the present invention, there is provided a stator for a rotating electric machine. The stator includes an annular stator core, a three-phase stator coil, a plurality of phase connecting members and a neutral connecting member. The stator core has a plurality of slots arranged in a circumferential direction thereof. The stator coil is comprised of three phase windings that are mounted on the stator core so as to be different in electrical phase from each other. Each of the phase connecting members is provided to electrically connect a corresponding one of the phase windings of the stator coil to an external electrical device. The neutral connecting member is provided to star-connect the phase windings of the stator coil to define a neutral point therebetween. The stator coil has an annular coil end part protruding from an axial end face of the stator core. The phase and neutral connecting members are located axially outside the stator core and radially outside the coil end part of the stator coil. The phase and neutral connecting members are arranged in axial alignment with each other. Among the phase and neutral connecting members, the neutral connecting member is located closest to the stator core.

With the above arrangement, it becomes possible to reduce the potential difference to ground, thereby preventing occurrence of a ground fault. As a result, it becomes possible to improve the insulation properties of the stator.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings:

FIG. 17 is a schematic view illustrating only the arrangement of a third sub-winding U3 of the U-phase winding;

FIG. 18 is a schematic view illustrating only the arrangement of a fourth sub-winding U4 of the U-phase winding;

FIG. 21 is a schematic view showing the number of in-slot portions of each of the sub-windings U1-U5 of the U-phase winding arranged at each of first to sixth layers in the U-phase slots A and B;

DESCRIPTION OF EMBODIMENTS

Figure 1:
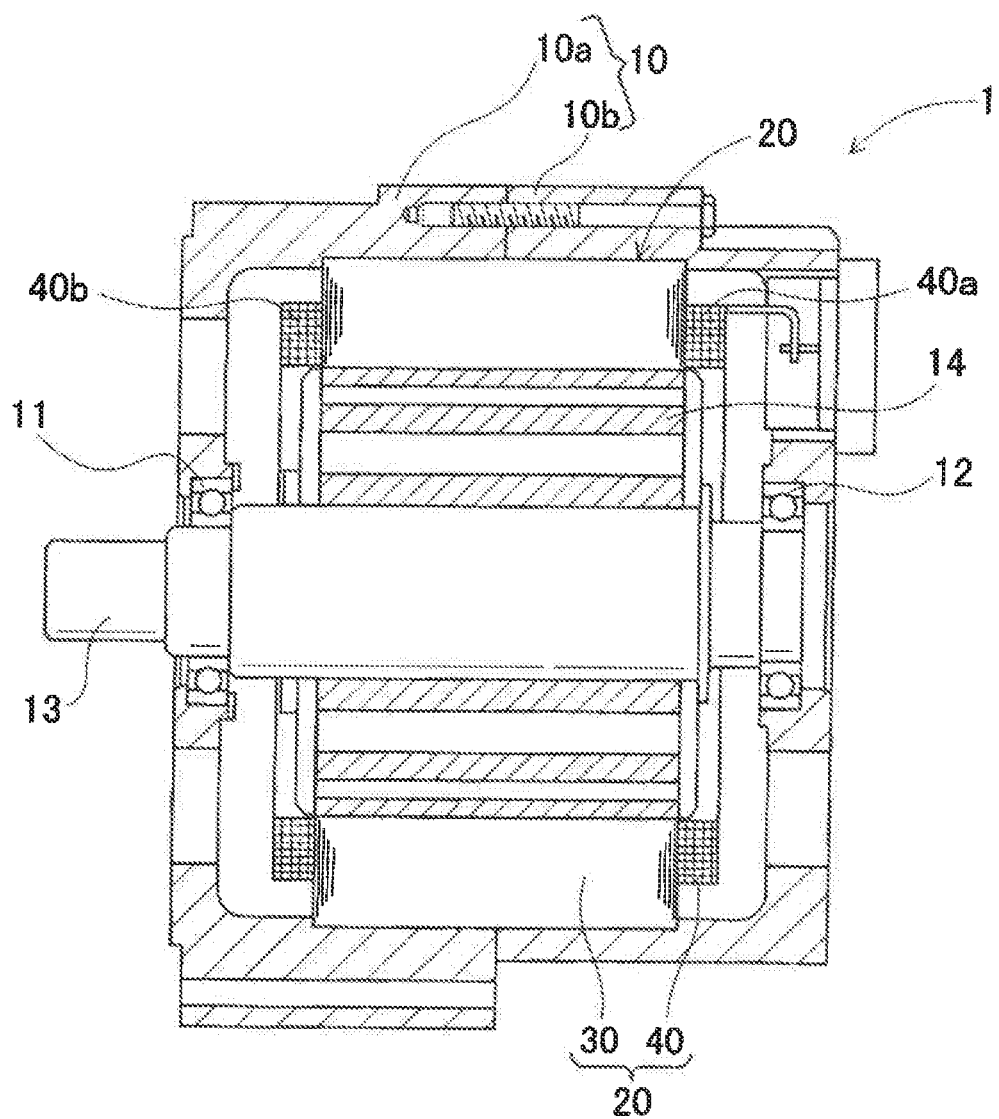
FIG. 1 is a partially cross-sectional view, taken along an axial direction, of a rotating electric machine which includes a stator according to a first embodiment.

Exemplary embodiments and their modifications will be described hereinafter with reference to FIGS. 1-41. It should be noted that for the sake of clarity and understanding, identical components having identical functions throughout the whole description have been marked, where possible, with the same reference numerals in each of the figures and that for the sake of avoiding redundancy, descriptions of the identical components will not be repeated.

First Embodiment

FIG. 1 shows the overall configuration of a rotating electric machine 1 according to a first embodiment.

The rotating electric machine 1 is designed to be used in a motor vehicle, such as a passenger car or truck, as an electric motor.

As shown in FIG. 1, the rotating electric machine 1 includes a housing 10, a rotor 14 and a stator 20. The housing 10 is comprised of a pair of cup-shaped housing pieces 10a and 10b which are jointed together at the open ends thereof. The housing 10 has a pair of bearings 11 and 12 mounted therein, via which a rotating shaft 13 is rotatably supported by the housing 10. The rotor 14 is received in the housing 10 and fixed on the rotating shaft 13. The stator 20 is fixed in the housing 10 so as to surround the radially outer periphery of the rotor 14.

The rotor 14 has a plurality of permanent magnets embedded at predetermined positions therein. The permanent magnets form a plurality of magnetic poles on the radially outer periphery of the rotor 14 facing the radially inner periphery of the stator 20. The magnetic poles are arranged in the circumferential direction of the rotor 14 at predetermined intervals so that the polarities of the magnetic poles alternate between north and south in the circumferential direction. The number of the magnetic poles can be suitably set according to the design specification of the rotating electric machine 1. In the present embodiment, the number of the magnetic poles is set to be equal to, for example, 10 (i.e., 5 north poles and 5 south poles).

Figure 2:
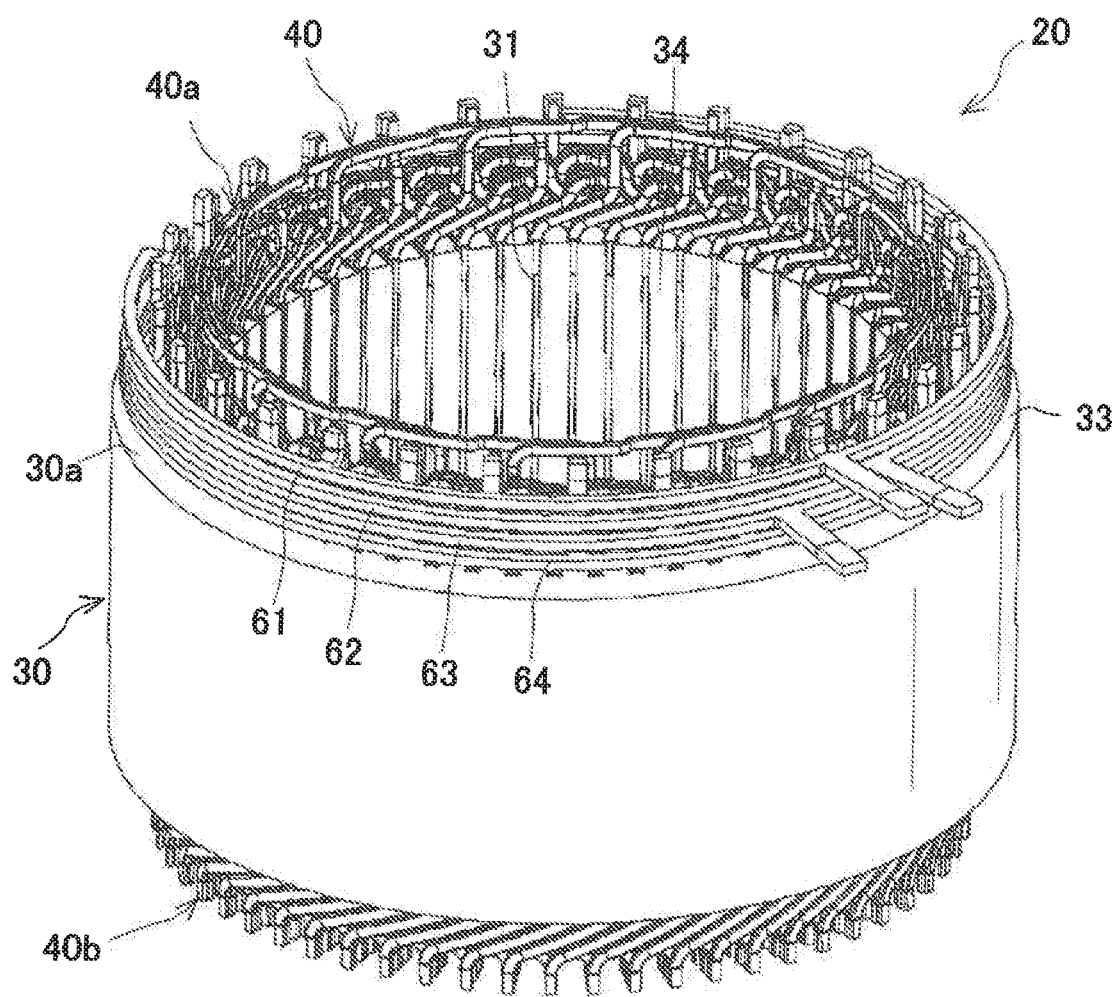
FIG. 2 is a perspective view of a stator of the rotating electric machine.
Figure 3:
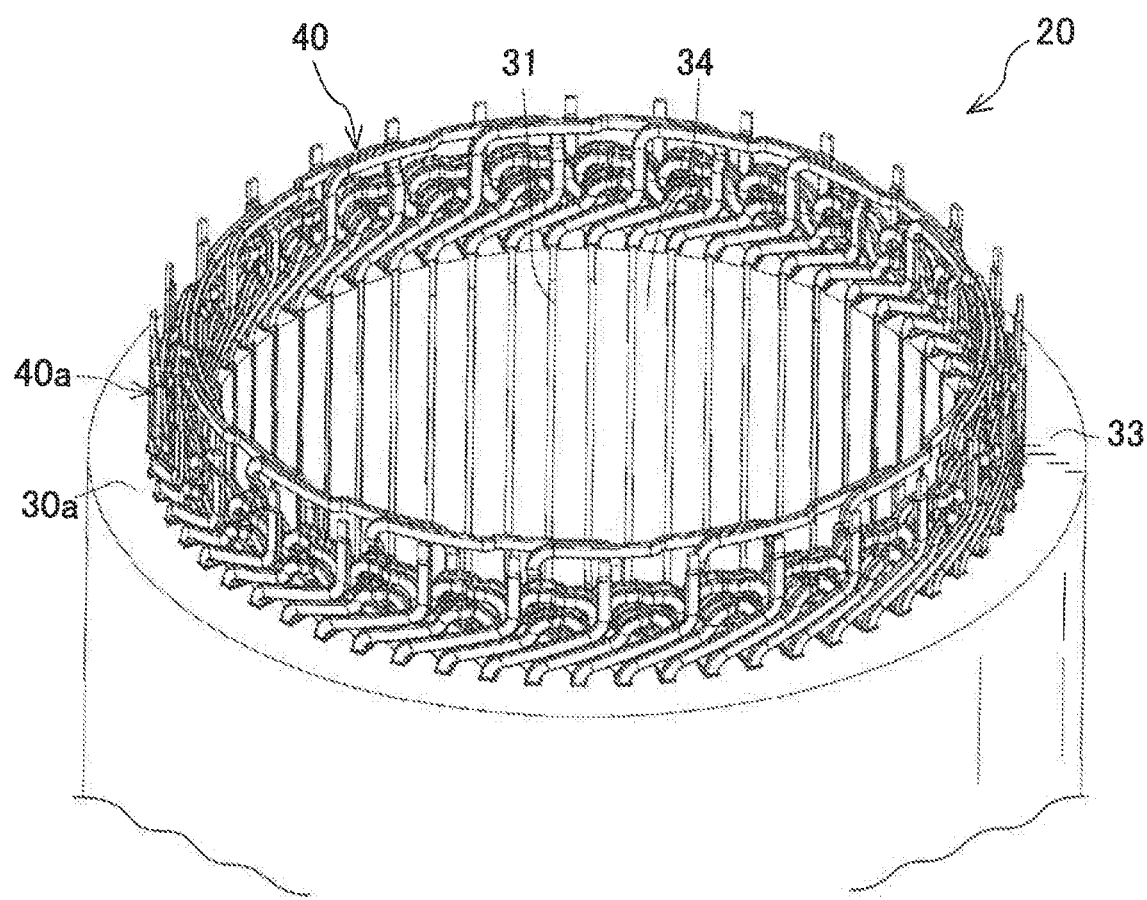
FIG. 3 is a perspective view of part of the stator including a first coil end part of a stator coil of the stator.

Referring now to FIGS. 2 and 3, the stator 20 includes: an annular (or hollow cylindrical) stator core 30 having a plurality of slots 31 arranged in the circumferential direction thereof; a three-phase stator coil 40 comprised of a U-phase winding 41U, a V-phase winding 41V and a W-phase winding 41W that are distributedly wave-wound on the stator core 30 so as to be received in the slots 31 of the stator core 30 and be different in electrical phase from each other; a U-phase busbar 61, a V-phase busbar 62 and a W-phase busbar 63 respectively electrically connecting the U-phase, V-phase and W-phase windings 41U, 41V and 41W of the stator coil 40 to an inverter (not shown); and a neutral busbar 64 electrically connecting the U-phase, V-phase and W-phase windings 41U, 41V and 41W of the stator coil 40 to define a neutral point therebetween. In addition, the U-phase, V-phase and W-phase busbars 61, 62 and 63 respectively correspond to U-phase, V-phase and W-phase connecting members while the neutral busbar 64 corresponds to a neutral connecting member.

In the present embodiment, the stator core 30 is formed by laminating a plurality of annular magnetic steel sheets in the axial direction of the stator core 30 and fixing them together by, for example, staking. In addition, between each adjacent pair of the magnetic steel sheets, there is interposed an insulating film. It should be appreciated that other conventional metal sheets may also be used instead of the magnetic steel sheets.

Moreover, as shown in FIGS. 2 and 3, the stator core 30 includes an annular back core 33 and a plurality of stator teeth 34 in addition to the aforementioned slots 31. The stator teeth 34 each extend radially inward from the back core 33 and are circumferentially spaced at a predetermined pitch. Each of the slots 31 is formed between one circumferentially-adjacent pair of the stator teeth 34. Accordingly, the slots 31 are circumferentially arranged at the same predetermined pitch as the stator teeth 34. Moreover, each of the slots 31 extends in the axial direction of the stator core 30 so as to axially penetrate the stator core 30 and opens on the radially inner surface of the stator core 30. In addition, for each of the slots 31, the depth direction of the slot 31 coincides with a radial direction of the stator core 30.

In the stator core 30, there are formed M slots 31 per magnetic pole of the rotor 14 that has the ten magnetic poles and per phase of the three-phase stator coil 40. Here, M represents a slot multiplier number which is a natural number greater than or equal to 2. In the present embodiment, the slot multiplier number M is set to be equal to 2. Accordingly, the total number of the slots 31 formed in the stator core 30 is equal to 60 (i.e., 2×10×3).

Figure 12:
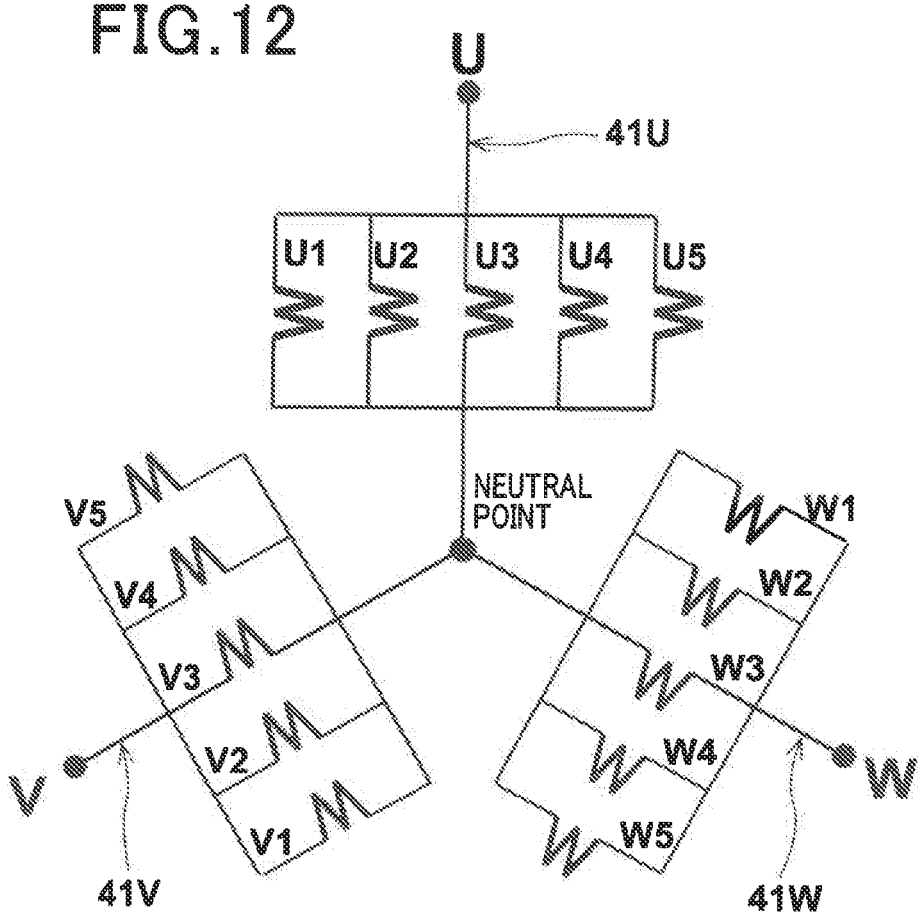
FIG. 12 is a schematic circuit diagram of the stator coil.

The U-phase, V-phase and W-phase windings 41U, 41V and 41W of the stator coil 40 are star-connected (or Y-connected) with each other (see FIG. 12). Each of the U-phase, V-phase and W-phase windings 41U, 41V and 41W includes a plurality of in-slot portions 51C and a plurality of turn portions 52A and 52B. Each of the in-slot portions 51C is received in one of the slots 31 of the stator core 30. Each of the turn portions 52A and 52B is located outside the slots 31 of the stator core 30 and connects one pair of the in-slot portions 51C respectively received in two different ones of the slots 31.

In the present embodiment, the stator coil 40 is formed by: (1) inserting a plurality of substantially U-shaped electric conductor segments 50 into the slots 31 of the stator core 30 from a first axial side (i.e., the upper side in FIG. 2) of the stator core 30; (2) twisting free end parts of each of the electric conductor segments 50, which protrude outside the slots 31 of the stator core 30 on a second axial side (i.e., the lower side in FIG. 2) of the stator core 30, respectively toward opposite circumferential sides; and (3) joining each corresponding pair of distal ends of the twisted free end parts of all the electric conductor segments 50 by, for example, welding. Consequently, all the electric conductor segments 50 are electrically connected in a predetermined pattern, forming the stator coil 40.

Figure 4:
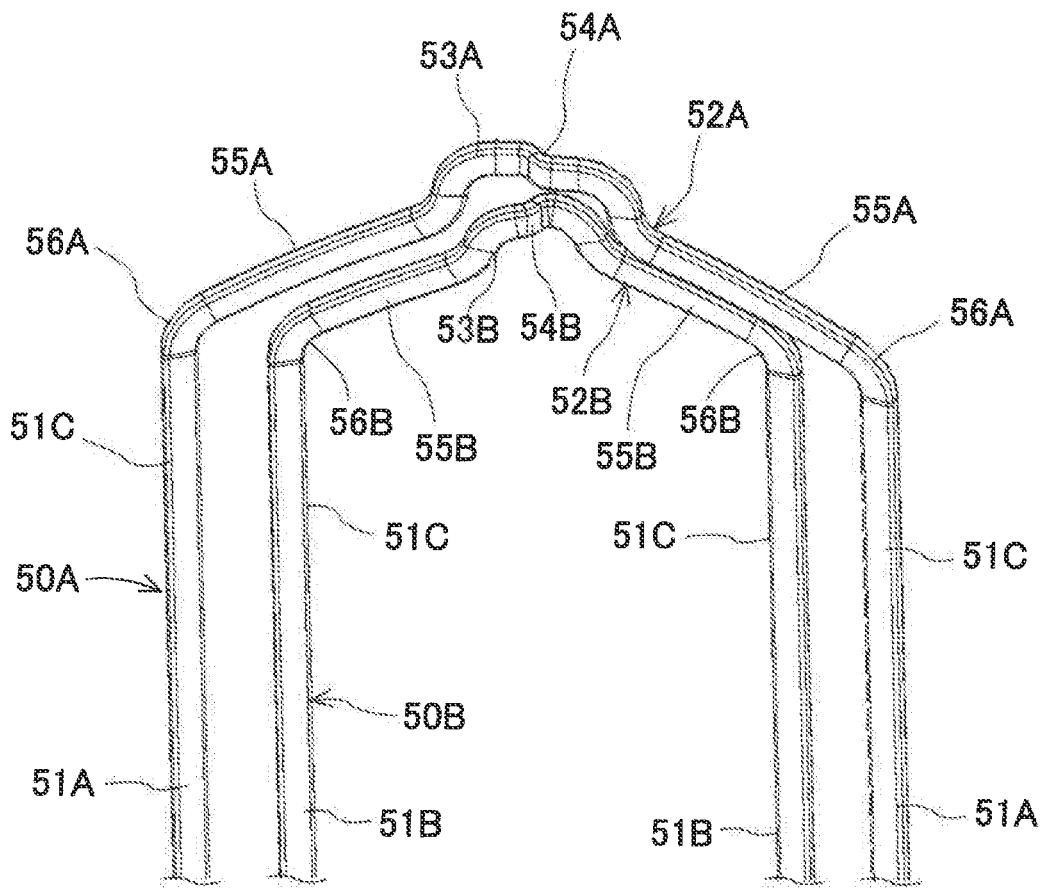
FIG. 4 is a perspective view of a pair of large and small electric conductor segments used for forming the stator coil.

Furthermore, in the present embodiment, as shown in FIG. 4, the electric conductor segments 50 forming the stator coil 40 are comprised of a plurality of large electric conductor segments 50A and a plurality of small electric conductor segments 50B that have a smaller size than the large electric conductor segments 50A. The large and small electric conductor segments 50A and 50B are formed by press-shaping an electric conductor wire, which has a substantially rectangular cross section, into the substantially U-shape using shaping dies. It should be noted that the shaping dies used for forming the large electric conductor segments 50A are different from those used for forming the small electric conductor segments 50B.

Each of the large electric conductor segments 50A has a pair of straight portions 51A extending parallel to each other and a turn portion 52A that connects ends of the straight portions 51A on the same side. On the other hand, each of the small electric conductor segments 50B has a pair of straight portions 51B extending parallel to each other and a turn portion 52B that connects ends of the straight portions 51B on the same side. The turn portions 52B of the small electric conductor segments 50B have a smaller length than the turn portions 52A of the large electric conductor segments 50A.

More specifically, in the present embodiment, the turn portions 52A of the large electric conductor segments 50A are formed to have a circumferential length of seven slot-pitches. On the other hand, the turn portions 52B of the small electric conductor segments 50B are formed to have a circumferential length of five slot-pitches. Consequently, it becomes possible to arrange the large and small electric conductor segments 50A and 50B so that each of the turn portions 52A of the large electric conductor segments 50A is located axially outside and overlaps one of the turn portions 52B of the small electric conductor segments 50B. Accordingly, the turn portions 52A of the large electric conductor segments 50A may be referred to as outer turn portions 52A; the turn portions 52B of the small electric conductor segments 50B may be referred to as inner turn portions 52B.

Moreover, each of the turn portions 52A of the large electric conductor segments 50A includes an apex part 53A that is positioned at the center of the turn portion 52A in the extending direction of the turn portion 52A (or in the circumferential direction of the stator core 30) and furthest in the turn portion 52A from a first axial end face 30a of the stator core 30; the first axial end face 30a is on the first axial side of the stator core 30. The apex part 53A extends in the circumferential direction of the stator core 30 and parallel to the first axial end face 30a of the stator core 30. Further, at the circumferential center of the apex part 53A, there is formed, by press-shaping, a crank-shaped part 54A that is bent to radially offset the apex part 53A. The amount of radial offset realized by the crank-shaped part 54A is set to be substantially equal to the radial thickness of the large and small electric conductor segments 50A and 50B. Similarly, each of the turn portions 52B of the small electric conductor segments 50B includes an apex part 53B that is positioned at the center of the turn portion 52B in the extending direction of the turn portion 52B (or in the circumferential direction of the stator core 30) and furthest in the turn portion 52B from the first axial end face 30a of the stator core 30. The apex part 53B extends in the circumferential direction of the stator core 30 and parallel to the first axial end face 30a of the stator core 30. Further, at the circumferential center of the apex part 53B, there is formed, by press-shaping, a crank-shaped part 54B that is bent to radially offset the apex part 53B. The amount of radial offset realized by the crank-shaped part 54B is also set to be substantially equal to the radial thickness of the large and small electric conductor segments 50A and 50B.

Figure 5:
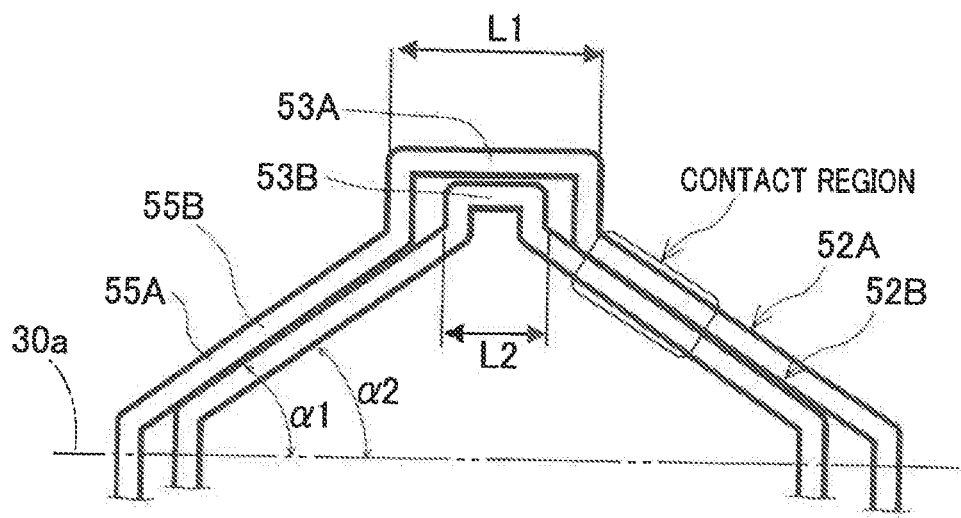
FIG. 5 is a schematic front view of part of the pair of large and small electric conductor segments.

In the present embodiment, as shown in FIG. 5, the circumferential length L1 of each of the outer apex parts 53A (i.e., the apex parts 53A of the turn portions 52A of the large electric conductor segments 50A) is set to be greater than the circumferential length L2 of each of the inner apex parts 53B (i.e., the apex parts 53B of the turn portions 52B of the small electric conductor segments 50B) by a predetermined amount. In addition, the outer apex parts 53A are located axially outside the inner apex parts 53B.

Figure 8:
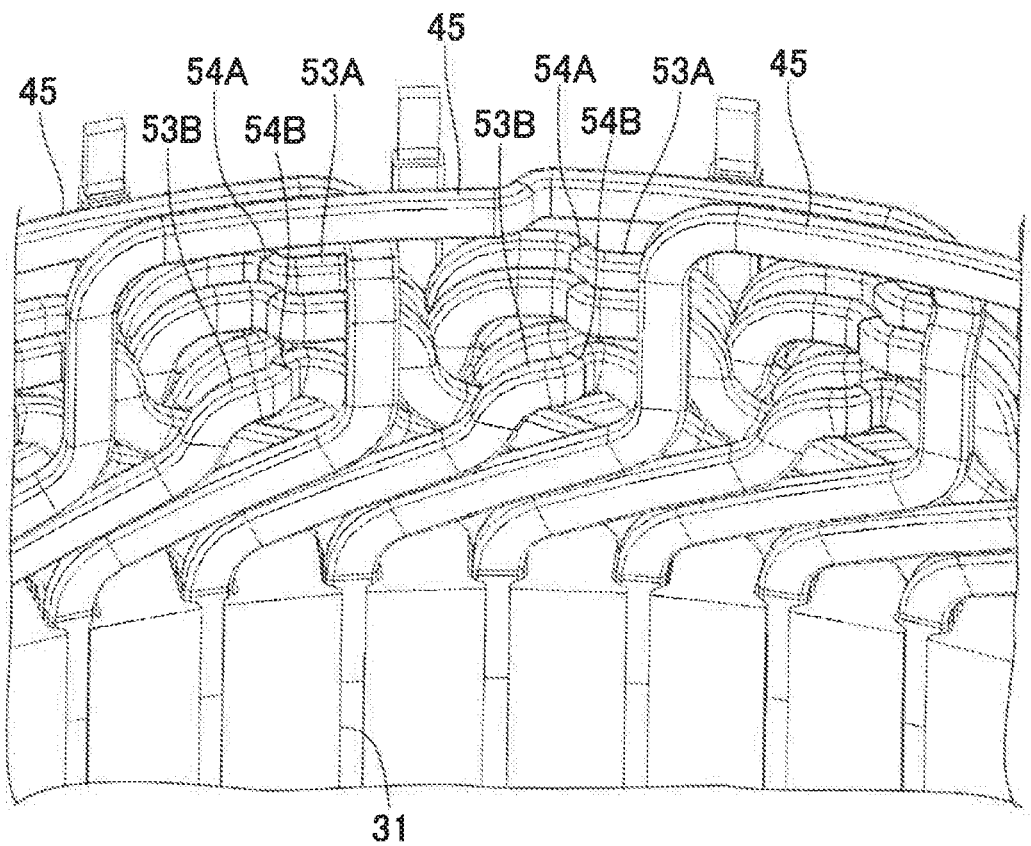
FIG. 8 is a perspective view showing part of the first coil end part of the stator coil.

Moreover, in the present embodiment, as shown in FIGS. 4 and 8, the bending direction of the crank-shaped parts 54A formed in the outer apex parts 53A is opposite to the bending direction of the crank-shaped parts 54B formed in the inner apex parts 53B.

More specifically, in FIG. 8, for each of the outer apex parts 53A, the crank-shaped part 54A formed in the outer apex part 53A is bent from a right end portion of the outer apex part 53A radially outward (i.e., in a direction into the plane of FIG. 8), so that a left end portion of the outer apex part 53A is located radially outside the right end portion. In contrast, for each of the inner apex parts 53B, the crank-shaped part 54B formed in the inner apex part 53B is bent from a right end portion of the inner apex part 53B radially inward (i.e., in a direction out of the plane of FIG. 8), so that a left end portion of the inner apex part 53B is located radially inside the right end portion.

Consequently, for each of the outer apex parts 53A, the left end portion of the outer apex part 53A is offset, by the crank-shaped part 54A formed in the outer apex part 53A, from the right end portion of the outer apex part 53A radially outward (i.e., in the direction into the plane of FIG. 8). In contrast, for each of the inner apex parts 53B, the left end portion of the inner apex part 53B is offset, by the crank-shaped part 54B formed in the inner apex part 53B, from the right end portion of the inner apex part 53B radially inward (i.e., in the direction out of the plane of FIG. 8).

That is, in the present embodiment, the direction of radial offset of the outer apex parts 53A by the respective crank-shaped parts 54A is opposite to the direction of radial offset of the inner apex parts 53B by the respective crank-shaped parts 54B.

Figure 9:
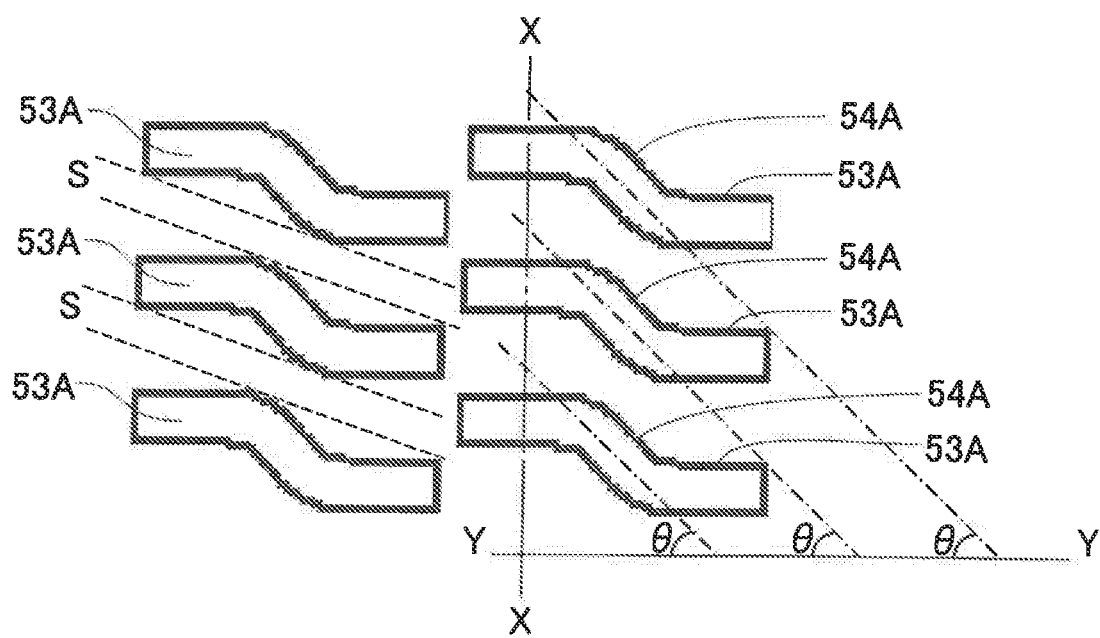
FIG. 9 is a schematic view illustrating the arrangement of apex parts of turn portions of the large electric conductor segments in the first coil end part of the stator coil.
Figure 10:
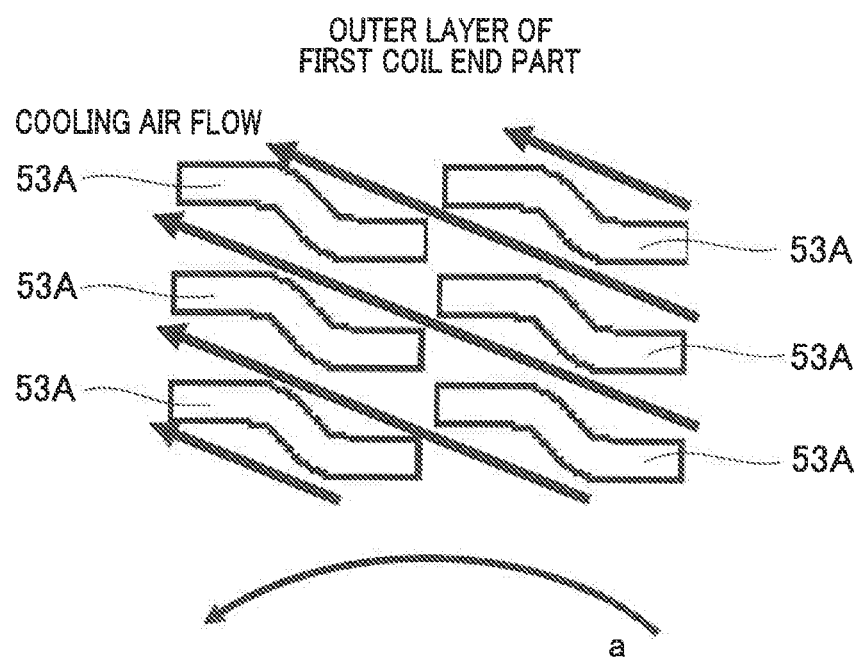
FIG. 10 is a schematic view illustrating the cooling air flow through the apex parts of the turn portions of the large electric conductor segments in the first coil end part of the stator coil.
Figure 11:
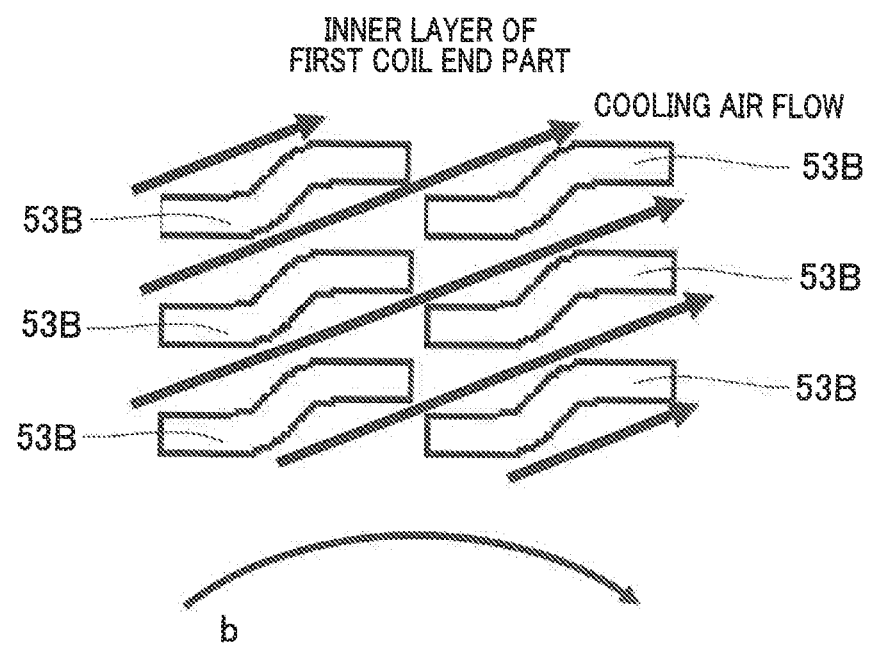
FIG. 11 is a schematic view illustrating the cooling air flow through apex parts of turn portions of the small electric conductor segments in the first coil end part of the stator coil.

Moreover, in the present embodiment, as shown in FIGS. 9-11, all of the inclination angles θ of the crank-shaped parts 54A and 54B formed in the respective outer and inner apex parts 53A and 53B to the circumferential direction of the stator core 30 are set to be equal to each other.

Furthermore, referring back to FIGS. 4 and 5, each of the turn portions 52A of the large electric conductor segments 50A also includes a pair of oblique parts 55A that are respectively formed on opposite circumferential sides of the apex part 53A so as to extend obliquely with respect to the first axial end face 30a of the stator core 30 at a first predetermined oblique angle α1. Each of the turn portions 52A of the large electric conductor segments 50A further includes a pair of bent parts 56A. Each of the bent parts 56A is formed, by press-shaping using shaping dies, between one of the oblique parts 55A and one of the straight portions 51A connected by the turn portion 52A. The bent parts 56A protrude from the first axial end face 30a of the stator core 30. Similarly, each of the turn portions 52B of the small electric conductor segments 50B also includes a pair of oblique parts 55B that are respectively formed on opposite circumferential sides of the apex part 53B so as to extend obliquely with respect to the first axial end face 30a of the stator core 30 at a second predetermined oblique angle α2. Each of the turn portions 52B of the small electric conductor segments 50B further includes a pair of bent parts 56B. Each of the bent parts 56B is formed, by press-shaping using shaping dies, between one of the oblique parts 55B and one of the straight portions 51B connected by the turn portion 52B. The bent parts 56B protrude from the first axial end face 30a of the stator core 30. In addition, in the present embodiment, the first predetermined oblique angle α1 and the second predetermined oblique angle α2 are set to be equal to each other (see FIG. 5).

Figure 6:
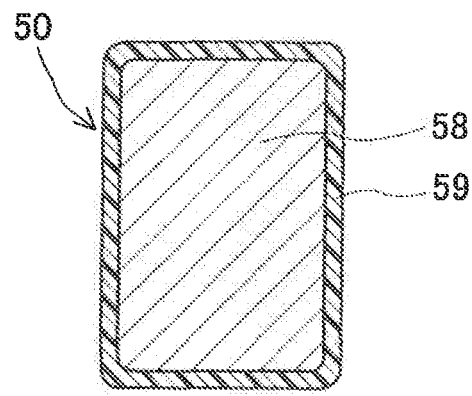
FIG. 6 is a cross-sectional view illustrating the configuration of the electric conductor segments used for forming the stator coil.

In the present embodiment, as shown in FIG. 6, each of the large and small electric conductor segments 50A and 50B is configured with an electric conductor 58 and an insulating coat 59 that covers the outer surface of the electric conductor 58. The electric conductor 58 is made, for example, of an electrically-conductive metal (e.g., copper) and has a substantially rectangular cross section. The insulating coat 59 is made, for example, of an electrically-insulative resin.

Figure 7:
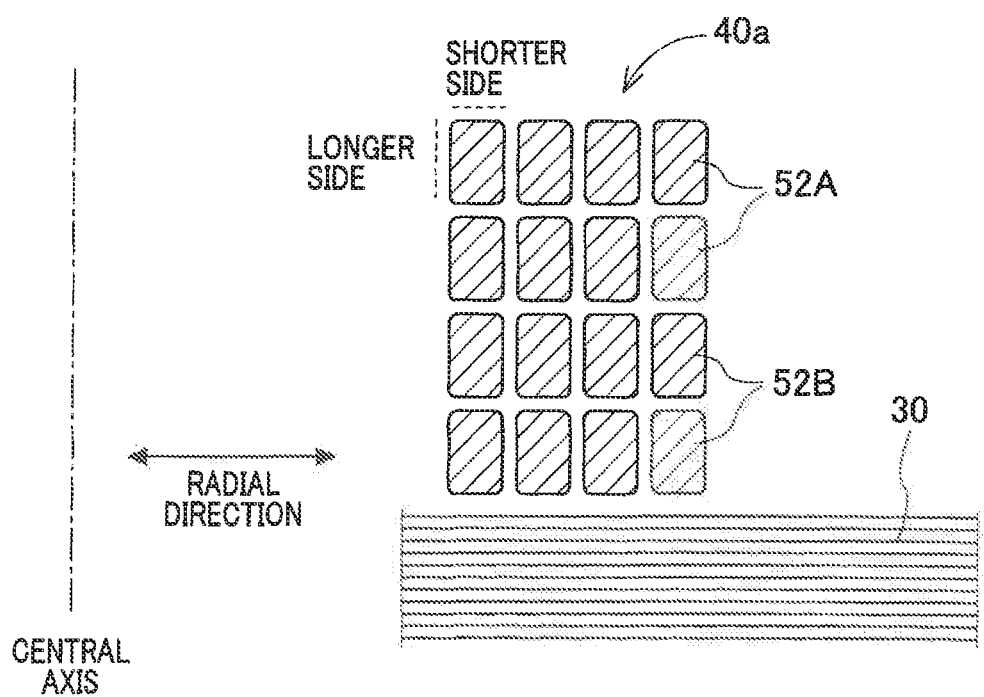
FIG. 7 is a schematic cross-sectional view illustrating the arrangement of the electric conductor segments in the first coil end part of the stator coil.

Moreover, in the present embodiment, as shown in FIG. 7, each of the large and small electric conductor segments 50A and 50B forming the stator coil 40 is arranged so that a pair of side faces of the electric conductor segment, which correspond to the longer sides of the substantially rectangular cross section of the electric conductor segment, face in the radial direction of the stator core 30.

Referring back to FIG. 2, the stator coil 40 has an annular first coil end part 40a on the first axial side (i.e., the upper side in FIG. 2) of the stator core 30 and an annular second coil end part 40b on the second axial side (i.e., the lower side in FIG. 2) of the stator core 30. The first coil end part 40a is constituted of the turn portions 52A and 52B of the large and small electric conductor segments 50A and 50B which protrude from the first axial end face 30a of the stator core 30. The second coil end part 40b is constituted of the twisted free end parts of the large and small electric conductor segments 50A and 50B which protrude from the second axial end face 30a of the stator core 30.

In the present embodiment, as shown in FIG. 8, the first coil end part 40a of the stator coil 40 has a two-layer structure such that for each circumferentially-adjacent pair of the turn portions 52A of the large electric conductor segments 50A and the turn portions 52B of the small electric conductor segments 50B, the apex parts 53A and 53B of the pair of the turn portions 52A and 52B axially overlap each other. That is, the turn portions 52A of the large electric conductor segments 50A, which are located on the axially outer side, together form an outer layer of the first coil end part 40a of the stator coil 40; the turn portions 52B of the small electric conductor segments 50B, which are located on the axially inner side, together constitute an inner layer of the first coil end part 40a. In addition, as described previously, the bending direction of the crank-shaped parts 54A formed in the apex parts 53A of the turn portions 52A of the large electric conductor segments 50A is opposite to the bending direction of the crank-shaped parts 54B formed in the apex parts 53B of the turn portions 52B of the small electric conductor segments 50B.

Moreover, as shown in FIG. 9, with all of the inclination angles θ of the crank-shaped parts 54A set to be equal to each other, each radially-facing pair of the crank-shaped parts 54A formed in the respective outer apex parts 53A extend parallel to each other keeping a radial space S therebetween. Further, for each of the outer apex parts 53A, the crank-shaped part 54A formed in the outer apex part 53A is inclined, at the inclination angle θ to an imaginary line Y which is perpendicular to a radially-extending imaginary line X, so that one circumferential end (i.e., the left end in FIG. 9) of the crank-shaped part 54A is located radially outward (i.e., upward in FIG. 9) of the other circumferential end (i.e., the right end in FIG. 9) of the crank-shaped part 54A. Consequently, as shown in FIG. 10, during rotation of the rotor 14 in a counterclockwise direction as indicated by an arrow a in FIG. 10, cooling air will flow from the radially inside to the radially outside of the first coil end part 40a of the stator coil 40 through the spaces formed between radially-facing pairs of the outer apex parts 53A in the outer layer of the first coil end part 40a. As a result, it is possible to secure the cooling performance of the rotating electric machine 1 when the rotor 14 rotates in the counterclockwise direction a.

Similarly, though not shown in the figures, with all of the inclination angles θ of the crank-shaped parts 54B set to be equal to each other, each radially-facing pair of the crank-shaped parts 54B formed in the respective inner apex parts 53B extend parallel to each other keeping a radial space S therebetween. However, the bending direction of the crank-shaped parts 54B formed in the respective inner apex parts 53B is opposite to the bending direction of the crank-shaped parts 54A formed in the respective outer apex parts 53A. Consequently, as shown in FIG. 11, during rotation of the rotor 14 in a clockwise direction as indicated by an arrow b in FIG. 11, cooling air will flow from the radially inside to the radially outside of the first coil end part 40a of the stator coil 40 through the spaces formed between radially-facing pairs of the inner apex parts 53B in the inner layer of the first coil end part 40a. As a result, it is also possible to secure the cooling performance of the rotating electric machine 1 when the rotor 14 rotates in the clockwise direction b.

In the present embodiment, as shown in FIG. 12, the U-phase, V-phase and W-phase windings 41U, 41V and 41W of the stator coil 40, which are star-connected with each other, are each comprised of a plurality (e.g., five in the present embodiment) of sub-windings that are connected parallel to each other.

Specifically, the U-phase winding 41U is comprised of sub-windings U1, U2, U3, U4 and U5 that are connected parallel to each other. The V-phase winding 41V is comprised of sub-windings V1, V2, V3, V4 and V5 that are connected parallel to each other. The W-phase winding 41W is comprised of sub-windings W1, W2, W3, W4 and W5 that are connected parallel to each other.

Figure 13:
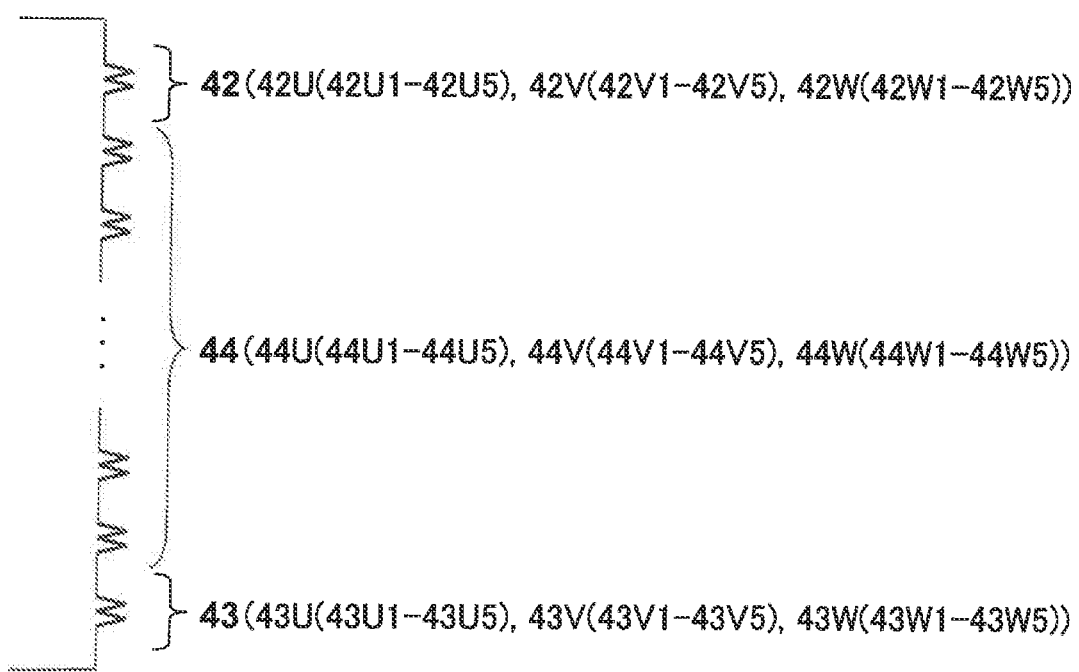
FIG. 13 is a schematic view illustrating the configuration of each of sub-windings of phase windings of the stator coil.

Moreover, in the present embodiment, as shown in FIG. 13, each of the sub-windings U1-U5, V1-V5 and W1-W5 of the phase windings 41U-41W of the stator coil 40 is configured to include: a terminal-side winding section 42 (more specifically, corresponding one of 42U1-42U5, 42V1-42V5 and 42W1-42W5) electrically connected to a corresponding one of the U-phase, V-phase and W-phase busbars 61, 62 and 63; a neutral point-side winding section 43 (more specifically, corresponding one of 43U1-43U5, 43V1-43V5 and 43W1-43W5) electrically connected to the neutral busbar 64; and a main winding section 44 (more specifically, corresponding one of 44U1-44U5, 44V1-44V5 and 44W1-44W5) between the terminal-side and neutral point-side winding sections 42 and 43. The terminal-side winding section 42 forms a terminal-side lead wire of the sub-winding, while the neutral point-side winding section 43 forms a neutral point-side lead wire of the sub-winding.

Specifically, taking only the sub-winding U1 of the U-phase winding 41U as an example, the sub-winding U1 is configured to include: a terminal-side winding section 42U1 electrically connected to the U-phase busbar 61; a neutral point-side winding section 43U1 electrically connected to the neutral busbar 64; and a main winding section 44U1 between the terminal-side and neutral point-side winding sections 42U1 and 43U1. The terminal-side winding section 42U1 forms a terminal-side lead wire of the sub-winding U1, while the neutral point-side winding section 43U1 forms a neutral point-side lead wire of the sub-winding U1.

In addition, for the sake of convenience of explanation, hereinafter, the terminal-side winding sections 42U1-42U5 of the sub-windings U1-U5 of the U-phase winding 41U will also be simply referred to as the terminal-side winding sections 42U of the U-phase winding 41U; the neutral point-side winding sections 43U1-43U5 of the sub-windings U1-U5 of the U-phase winding 41U will also be simply referred to as the neutral point-side winding sections 43U of the U-phase winding 41U; and the main winding sections 44U1-44U5 of the sub-windings U1-U5 of the U-phase winding 41U will also be simply referred to as the main winding sections 44U of the U-phase winding 41U. Similarly, the terminal-side winding sections 42V1-42V5 of the sub-windings V1-V5 of the V-phase winding 41V will also be simply referred to as the terminal-side winding sections 42V of the V-phase winding 41V; the neutral point-side winding sections 43V1-43V5 of the sub-windings V1-V5 of the V-phase winding 41V will also be simply referred to as the neutral point-side winding sections 43V of the V-phase winding 41V; and the main winding sections 44V1-44V5 of the sub-windings V1-V5 of the V-phase winding 41V will also be simply referred to as the main winding sections 44V of the V-phase winding 41V. The terminal-side winding sections 42W1-42W5 of the sub-windings W1-W5 of the W-phase winding 41W will also be simply referred to as the terminal-side winding sections 42W of the W-phase winding 41W; the neutral point-side winding sections 43W1-43W5 of the sub-windings W1-W5 of the W-phase winding 41W will also be simply referred to as the neutral point-side winding sections 43W of the W-phase winding 41W; and the main winding sections 44W1-44W5 of the sub-windings W1-W5 of the W-phase winding 41W will also be simply referred to as the main winding sections 44W of the W-phase winding 41W.

In the present embodiment, the U-phase, V-phase and W-phase windings 41U, 41V and 41W of the stator coil 40 are arranged in the slots 31 of the stator core 30 in the same manner. Therefore, for the sake of avoiding redundancy, only the arrangement of the U-phase winding 41U in the slots 31 of the stator core 30 will be described hereinafter with reference to FIGS. 14-21.

Figure 14:
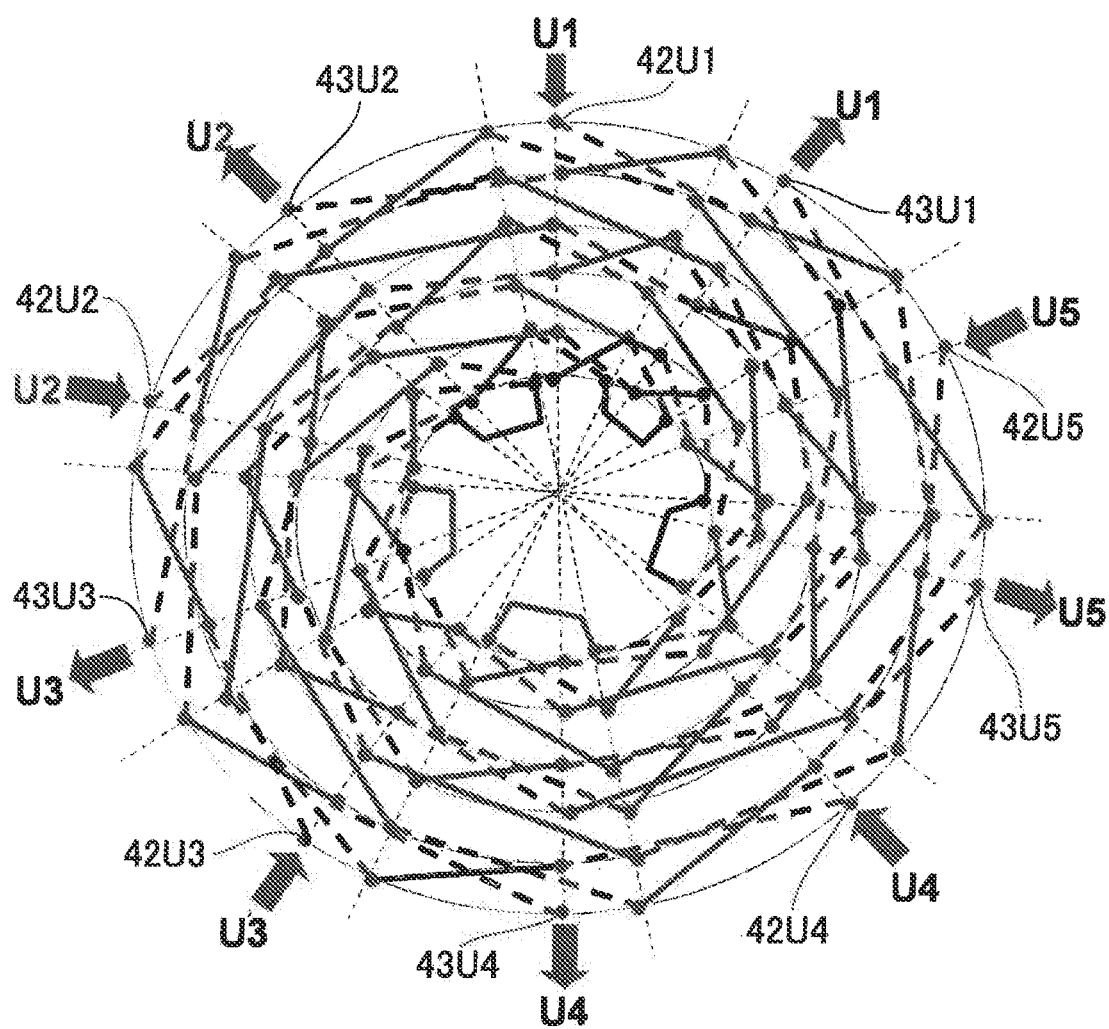
FIG. 14 is a schematic view illustrating the arrangement of a U-phase winding of the stator coil.
Figure 15:
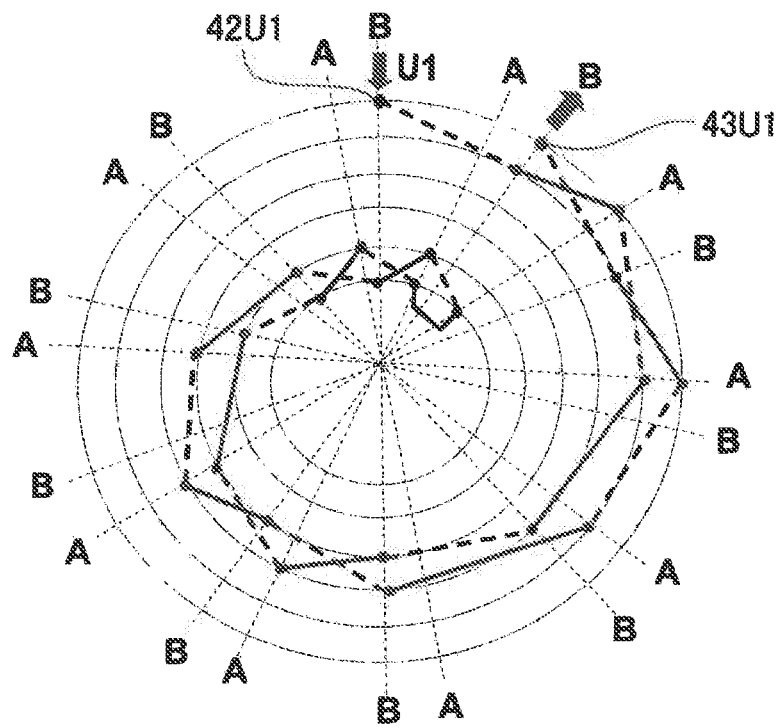
FIG. 15 is a schematic view illustrating only the arrangement of a first sub-winding U1 of the U-phase winding.
Figure 16:
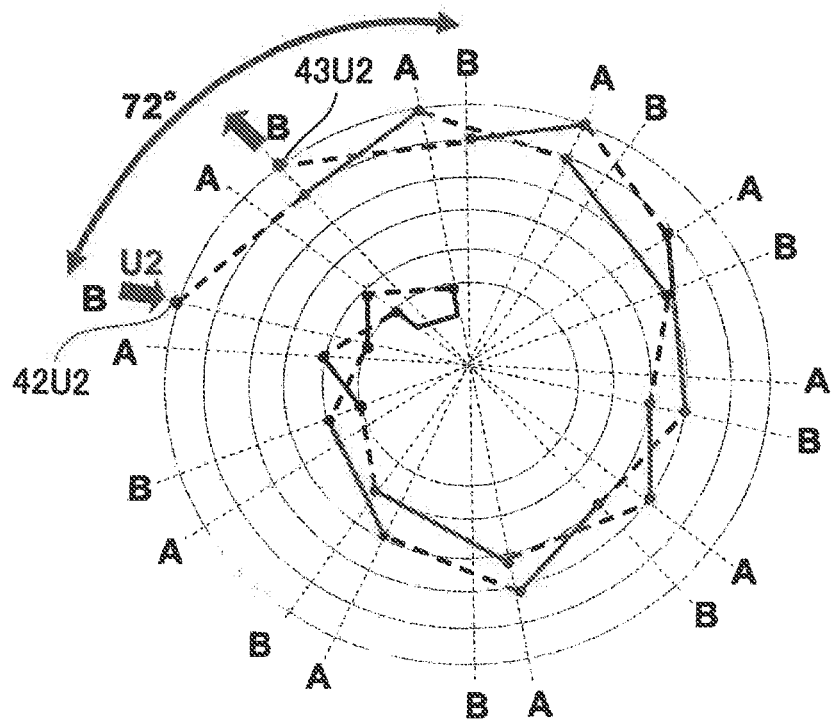
FIG. 16 is a schematic view illustrating only the arrangement of a second sub-winding U2 of the U-phase winding.
Figure 19:
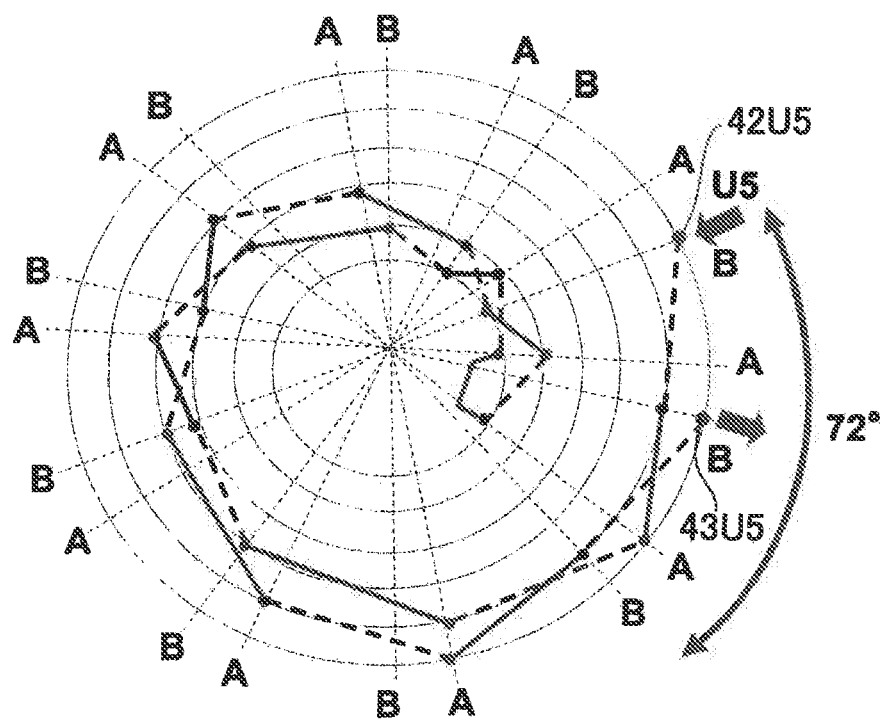
FIG. 19 is a schematic view illustrating only the arrangement of a fifth sub-winding U5 of the U-phase winding.

FIG. 14 illustrates, among the three phase windings 41U-41W of the stator coil 40, only the U-phase winding 41U arranged in the slots 31 of the stator core 30. FIG. 15 illustrates, among the five sub-windings U1-U5 of the U-phase winding 41U, only the first sub-winding U1 arranged in the slots 31 of the stator core 30. FIG. 16 illustrates, among the five sub-windings U1-U5 of the U-phase winding 41U, only the second sub-winding U2 arranged in the slots 31 of the stator core 30. FIG. 17 illustrates, among the five sub-windings U1-U5 of the U-phase winding 41U, only the third sub-winding U3 arranged in the slots 31 of the stator core 30. FIG. 18 illustrates, among the five sub-windings U1-U5 of the U-phase winding 41U, only the fourth sub-winding U4 arranged in the slots 31 of the stator core 30. FIG. 19 illustrates, among the five sub-windings U1-U5 of the U-phase winding 41U, only the fifth sub-winding U5 arranged in the slots 31 of the stator core 30.

In the present embodiment, as mentioned previously, the number of the magnetic poles formed in the rotor 14 by the permanent magnets is equal to 10. Moreover, during operation of the rotating electric machine 1, magnetic flux, which is generated by the rotor 14 and passes through the stator 20, forms a plurality of magnetic poles in the stator 20. The number of the magnetic poles formed in the stator 20 is also equal to 10, corresponding to the number of the magnetic poles of the rotor 14. That is, the number of the magnetic poles formed in the stator 20 is a multiple of the number of sub-windings of the U-phase winding 41U, more specifically the least common multiple of 2 and the number of sub-windings of the U-phase winding 41U (i.e., 2×5=10).

In FIGS. 14-19, let the magnetic pole located at twelve o'clock be the first pole and the remaining magnetic poles respectively be the second to the tenth poles counting in the clockwise direction. Moreover, in FIGS. 14-19, the electrical connection between the in-slot portions 51C of the U-phase winding 41U on the first coil end part 40a side (i.e., on the first axial side of the stator core 30) are shown with continuous lines while the electrical connection between the in-slot portions 51C of the U-phase winding 41U on the second coil end part 40b side (i.e., on the second axial side of the stator core 30) are shown with dashed lines.

In the present embodiment, the in-slot portions 51C of the U-phase winding 41C are received in ten pairs of the slots 31 of the stator core 30. Hereinafter, for the sake of convenience of explanation, these ten pairs of the slots 31 will be referred to as ten pairs of U-phase slots A and B. For each of the ten pairs, the two U-phase slots A and B of the pair are circumferentially adjacent to each other. Moreover, since the slot multiplier number M is set to 2, the ten pairs of the U-phase slots A and B are circumferentially spaced at six slot-pitches. That is, the U-phase slots A are circumferentially spaced from one another at six slot-pitches; the U-phase slots B are circumferentially spaced from one another at six slot-pitches.

Furthermore, in the present embodiment, in each of the U-phase slots A and B, there are received six of the in-slot portions 51C of the U-phase winding 41U in radial alignment with each other (see FIG. 14). In other words, in each of the U-phase slots A and B, there are received the in-slot portions 51C of the U-phase winding 41U in six layers. Hereinafter, the six layers will be sequentially referred to as the first, second, . . . , fifth and sixth layers from the radially inner side to the radially outer side. In addition, for each of the sub-windings U1-U5 of the U-phase winding 41U, the in-slot portions 51C of the sub-winding will be sequentially referred to as the first, second, . . . , 23rd and 24th in-slot portions from the winding start side to the winding finish side.

First, referring to FIG. 15, the arrangement of the 24 in-slot portions of the first sub-winding U1 of the U-phase winding 41U in the ten pairs of the U-phase slots A and B will be described.

The first in-slot portion of the sub-winding U1 is arranged at the sixth layer (i.e., the radially outermost layer) in the U-phase slot B of the first pole. The second in-slot portion of the sub-winding U1 is arranged at the fifth layer in the U-phase slot B of the second pole; the U-phase slot B of the second pole is away from the U-phase slot B of the first pole by six slot-pitches in the clockwise direction.

In addition, the first in-slot portion of the sub-winding U1 is included in the terminal-side winding section 42U1 of the sub-winding U1. A winding start-side end of the terminal-side winding section 42U1 is extended to the first coil end part 40a side (i.e., the front side of FIG. 15), forming the terminal-side lead wire of the sub-winding U1.

The third in-slot portion of the sub-winding U1 is arranged at the sixth layer in the U-phase slot A of the third pole; the U-phase slot A of the third pole is away from the U-phase slot B of the second pole by five slot-pitches in the clockwise direction. The fourth in-slot portion of the sub-winding U1 is arranged at the fifth layer in the U-phase slot A of the fourth pole; the U-phase slot A of the fourth pole is away from the U-phase slot A of the third pole by six slot-pitches in the clockwise direction.

The fifth in-slot portion of the sub-winding U1 is arranged at the fourth layer in the U-phase slot B of the fifth pole; the U-phase slot B of the fifth pole is away from the U-phase slot A of the fourth pole by seven slot-pitches in the clockwise direction. The sixth in-slot portion of the sub-winding U1 is arranged at the third layer in the U-phase slot B of the sixth pole; the U-phase slot B of the sixth pole is away from the U-phase slot B of the fifth pole by six slot-pitches in the clockwise direction.

The seventh in-slot portion of the sub-winding U1 is arranged at the fourth layer in the U-phase slot A of the seventh pole; the U-phase slot A of the seventh pole is away from the U-phase slot B of the sixth pole by five slot-pitches in the clockwise direction. The eighth in-slot portion of the sub-winding U1 is arranged at the third layer in the U-phase slot A of the eighth pole; the U-phase slot A of the eighth pole is away from the U-phase slot A of the seventh pole by six slot-pitches in the clockwise direction.

The ninth in-slot portion of the sub-winding U1 is arranged at the second layer in the U-phase slot B of the ninth pole; the U-phase slot B of the ninth pole is away from the U-phase slot A of the eighth pole by seven slot-pitches in the clockwise direction. The tenth in-slot portion of the sub-winding U1 is arranged at the first layer in the U-phase slot B of the tenth pole; the U-phase slot B of the tenth pole is away from the U-phase slot B of the ninth pole by six slot-pitches in the clockwise direction.

The eleventh in-slot portion of the sub-winding U1 is arranged at the second layer in the U-phase slot A of the first pole; the U-phase slot A of the first pole is away from the U-phase slot B of the tenth pole by five slot-pitches in the clockwise direction. The twelfth in-slot portion of the sub-winding U1 is arranged at the first layer in the U-phase slot A of the second pole; the U-phase slot A of the second pole is away from the U-phase slot A of the first pole by six slot-pitches in the clockwise direction.

The thirteenth in-slot portion of the sub-winding U1 is arranged at the first layer in the U-phase slot A of the third pole; the U-phase slot A of the third pole is away from the U-phase slot A of the second pole by six slot-pitches in the clockwise direction. In addition, the thirteenth in-slot portion of the sub-winding U1 is connected with the twelfth in-slot portion of the sub-winding U1 via a bridging wire 45 (see FIGS. 8, 32 and 33) on the first coil end part 40*a* side. The fourteenth in-slot portion of the sub-winding U1 is arranged at the second layer in the U-phase slot A of the second pole; the U-phase slot A of the second pole is away from the U-phase slot A of the third pole by six slot-pitches in the counterclockwise direction. That is, from the fourteenth in-slot portion, the sub-winding U1 starts to be wound back in the counterclockwise direction.

The fifteenth in-slot portion of the sub-winding U1 is arranged at the first layer in the U-phase slot B of the first pole; the U-phase slot B of the first pole is away from the U-phase slot A of the second pole by five slot-pitches in the counterclockwise direction. The sixteenth in-slot portion of the sub-winding U1 is arranged at the second layer in the U-phase slot B of the tenth pole; the U-phase slot B of the tenth pole is away from the U-phase slot B of the first pole by six slot-pitches in the counterclockwise direction.

The seventeenth in-slot portion of the sub-winding U1 is arranged at the third layer in the U-phase slot A of the ninth pole; the U-phase slot A of the ninth pole is away from the U-phase slot B of the tenth pole by seven slot-pitches in the counterclockwise direction. The eighteenth in-slot portion of the sub-winding U1 is arranged at the fourth layer in the U-phase slot A of the eighth pole; the U-phase slot A of the eighth pole is away from the U-phase slot A of the ninth pole by six slot-pitches in the counterclockwise direction.

The nineteenth in-slot portion of the sub-winding U1 is arranged at the third layer in the U-phase slot B of the seventh pole; the U-phase slot B of the seventh pole is away from the U-phase slot A of the eighth pole by five slot-pitches in the counterclockwise direction. The twentieth in-slot portion of the sub-winding U1 is arranged at the fourth layer in the U-phase slot B of the sixth pole; the U-phase slot B of the sixth pole is away from the U-phase slot B of the seventh pole by six slot-pitches in the counterclockwise direction.

The 21st in-slot portion of the sub-winding U1 is arranged at the fifth layer in the U-phase slot A of the fifth pole; the U-phase slot A of the fifth pole is away from the U-phase slot B of the sixth pole by seven slot-pitches in the counterclockwise direction. The 22nd in-slot portion of the sub-winding U1 is arranged at the sixth layer in the U-phase slot A of the fourth pole; the U-phase slot A of the fourth pole is away from the U-phase slot A of the fifth pole by six slot-pitches in the counterclockwise direction.

The 23rd in-slot portion of the sub-winding U1 is arranged at the fifth layer in the U-phase slot B of the third pole; the U-phase slot B of the third pole is away from the U-phase slot A of the fourth pole by five slot-pitches in the counterclockwise direction. The 24th in-slot portion of the sub-winding U1 is arranged at the sixth layer (i.e., the radially outermost layer) in the U-phase slot B of the second pole; the U-phase slot B of the second pole is away from the U-phase slot B of the third pole by six slot-pitches in the counterclockwise direction.

In addition, the 24th in-slot portion of the sub-winding U1 is included in the neutral point-side winding section 43U1 of the sub-winding U1. A winding finish-side end of the neutral point-side winding section 43U1 is extended to the first coil end part 40*a* side (i.e., the front side of FIG. 15), forming the neutral point-side lead wire 43U1 of the sub-winding U1.

The sub-winding U1 is wound on the stator core 30 so that the first to the 24th in-slot portions of the sub-winding U1 are received in the ten pairs of the U-phase slots A and B of the stator core 30 as described above. Moreover, as shown with the continuous lines in FIG. 15, on the first axial side of the stator core 30, the in-slot portions of the sub-winding U1 are connected by the outer turn portions 52A of the sub-winding U1 (i.e., the turn portions 52A of the large electric conductor segments 50A forming the sub-winding U1) and the inner turn portions 52B of the sub-winding U1 (i.e., the turn portions 52B of the small electric conductor segments 50B forming the sub-winding U1). The outer turn portions 52A of the sub-winding U1 are arranged alternately with the inner turn portions 52B of the sub-winding U1 in the circumferential direction of the stator core 30; the outer turn portions 52A have the circumferential length of seven slot-pitches while the inner turn portions 52B have the circumferential length of five slot-pitches. On the other hand, as shown with the dashed lines in FIG. 15, on the second axial side of the stator core 30, the in-slot portions of the sub-winding U1 are connected by connection portions of the sub-winding U1. Each of the connection portions is constituted of one joined-pair of the twisted free end parts of the large and small electric conductor segments 50A and 50B forming the sub-winding U1, and has a circumferential length of six slot-pitches.

Next, referring to FIG. 16, the arrangement of the 24 in-slot portions of the second sub-winding U2 of the U-phase winding 41U in the ten pairs of the U-phase slots A and B will be described.

The first in-slot portion of the sub-winding U2 is arranged at the sixth layer in the U-phase slot B of the ninth pole. The second in-slot portion of the sub-winding U2 is arranged at the fifth layer in the U-phase slot B of the tenth pole; the U-phase slot B of the tenth pole is away from the U-phase slot B of the ninth pole by six slot-pitches in the clockwise direction.

That is, the first and second in-slot portions of the sub-winding U2 are respectively offset from the first and second in-slot portions of the sub-winding U1 by an offset angle of 72° in the counterclockwise direction. Here, the offset angle of 72° is equal to the quotient of 360° divided by the number of the sub-windings of the U-phase winding 41U (i.e., 5 in the present embodiment).

Moreover, the third to the 24th in-slot portions of the sub-winding U2 are arranged in the U-phase slots A and B of the stator core 30 so as to be respectively offset from the third to the 24th in-slot portions of the sub-winding U1 by the offset angle of 72° in the counterclockwise direction.

In addition, the first in-slot portion of the sub-winding U2 is included in the terminal-side winding section 42U2 of the sub-winding U2, while the 24th in-slot portion of the sub-winding U2 is included in the neutral point-side winding section 43U2 of the sub-winding U2. Both a winding start-side end of the terminal-side winding section 42U2 and a winding finish-side end of the neutral point-side winding section 43U2 are extended to the first coil end part 40*a* side (i.e., the front side of FIG. 16), respectively forming the terminal-side and neutral point-side lead wires of the sub-winding U2.

Next, referring to FIG. 17, the arrangement of the 24 in-slot portions of the third sub-winding U3 of the U-phase winding 41U in the ten pairs of the U-phase slots A and B will be described.

The first in-slot portion of the sub-winding U3 is arranged at the sixth layer in the U-phase slot B of the seventh pole. The second in-slot portion of the sub-winding U3 is arranged at the fifth layer in the U-phase slot B of the eighth pole; the U-phase slot B of the eighth pole is away from the U-phase slot B of the seventh pole by six slot-pitches in the clockwise direction.

That is, the first and second in-slot portions of the sub-winding U3 are respectively offset from the first and second in-slot portions of the sub-winding U2 by the offset angle of 72° in the counterclockwise direction.

Moreover, the third to the 24th in-slot portions of the sub-winding U3 are arranged in the U-phase slots A and B of the stator core 30 so as to be respectively offset from the third to the 24th in-slot portions of the sub-winding U2 by the offset angle of 72° in the counterclockwise direction.

In addition, the first in-slot portion of the sub-winding U3 is included in the terminal-side winding section 42U3 of the sub-winding U3, while the 24th in-slot portion of the sub-winding U3 is included in the neutral point-side winding section 43U3 of the sub-winding U3. Both a winding start-side end of the terminal-side winding section 42U3 and a winding finish-side end of the neutral point-side winding section 43U3 are extended to the first coil end part 40*a* side (i.e., the front side of FIG. 17), respectively forming the terminal-side and neutral point-side lead wires of the sub-winding U3.

Next, referring to FIG. 18, the arrangement of the 24 in-slot portions of the fourth sub-winding U4 of the U-phase winding 41U in the ten pairs of the U-phase slots A and B will be described.

The first in-slot portion of the sub-winding U4 is arranged at the sixth layer in the U-phase slot B of the fifth pole. The second in-slot portion of the sub-winding U4 is arranged at the fifth layer in the U-phase slot B of the sixth pole; the U-phase slot B of the sixth pole is away from the U-phase slot B of the fifth pole by six slot-pitches in the clockwise direction.

That is, the first and second in-slot portions of the sub-winding U4 are respectively offset from the first and second in-slot portions of the sub-winding U3 by the offset angle of 72° in the counterclockwise direction.

Moreover, the third to the 24th in-slot portions of the sub-winding U4 are arranged in the U-phase slots A and B of the stator core 30 so as to be respectively offset from the third to the 24th in-slot portions of the sub-winding U3 by the offset angle of 72° in the counterclockwise direction.

In addition, the first in-slot portion of the sub-winding U4 is included in the terminal-side winding section 42U4 of the sub-winding U4, while the 24th in-slot portion of the sub-winding U4 is included in the neutral point-side winding section 43U4 of the sub-winding U4. Both a winding start-side end of the terminal-side winding section 42U4 and a winding finish-side end of the neutral point-side winding section 43U4 are extended to the first coil end part 40*a* side (i.e., the front side of FIG. 18), respectively forming the terminal-side and neutral point-side lead wires of the sub-winding U4.

Next, referring to FIG. 19, the arrangement of the 24 in-slot portions of the fifth sub-winding U5 of the U-phase winding 41U in the ten pairs of the U-phase slots A and B will be described.

The first in-slot portion of the sub-winding U5 is arranged at the sixth layer in the U-phase slot B of the third pole. The second in-slot portion of the sub-winding U5 is arranged at the fifth layer in the U-phase slot B of the fourth pole; the U-phase slot B of the fourth pole is away from the U-phase slot B of the third pole by six slot-pitches in the clockwise direction.

That is, the first and second in-slot portions of the sub-winding U5 are respectively offset from the first and second in-slot portions of the sub-winding U4 by the offset angle of 72° in the counterclockwise direction.

Moreover, the third to the 24th in-slot portions of the sub-winding U5 are arranged in the U-phase slots A and B of the stator core 30 so as to be respectively offset from the third to the 24th in-slot portions of the sub-winding U4 by the offset angle of 72° in the counterclockwise direction.

In addition, the first in-slot portion of the sub-winding U5 is included in the terminal-side winding section 42U5 of the sub-winding U5, while the 24th in-slot portion of the sub-winding U5 is included in the neutral point-side winding section 43U5 of the sub-winding U5. Both a winding start-side end of the terminal-side winding section 42U5 and a winding finish-side end of the neutral point-side winding section 43U5 are extended to the first coil end part 40*a* side (i.e., the front side of FIG. 19), respectively forming the terminal-side and neutral point-side lead wires of the sub-winding U5.

Consequently, as seen from FIGS. 14-19, all of the terminal-side and neutral point-side lead wires of the sub-windings U1-U5 of the U-phase winding 41U are electrically connected respectively with the first and 24th in-slot portions of the sub-windings U1-U5 which are arranged at the radially outermost layer (i.e., the sixth layer in the present embodiment) respectively in the ten U-phase slots B.

As described above, in the present embodiment, the sub-windings U1-U5 of the U-phase winding 41U are arranged with rotational symmetry so as to be circumferentially offset from one another by the offset angle of 72°; the offset angle of 72° is equal to the quotient of 360° divided by the number of the sub-windings of the U-phase winding 41U (i.e., equal to 360°/5). Moreover, in each of the U-phase slots A and B, there are arranged six of the in-slot portions 51C of the U-phase winding 41U in six layers so as to be radially aligned with each other. Furthermore, for each of the sub-windings U1-U5 of the U-phase winding 41U, the in-slot portion 51C of the sub-winding which is arranged at the Nth layer in one of the U-phase slots A and B is electrically connected with the in-slot portion 51C of the sub-winding which is arranged at the (N+1)th layer in another one of the U-phase slots A and B, where N is an arbitrary natural number greater than or equal to 1 and less than 6.

Figure 20:
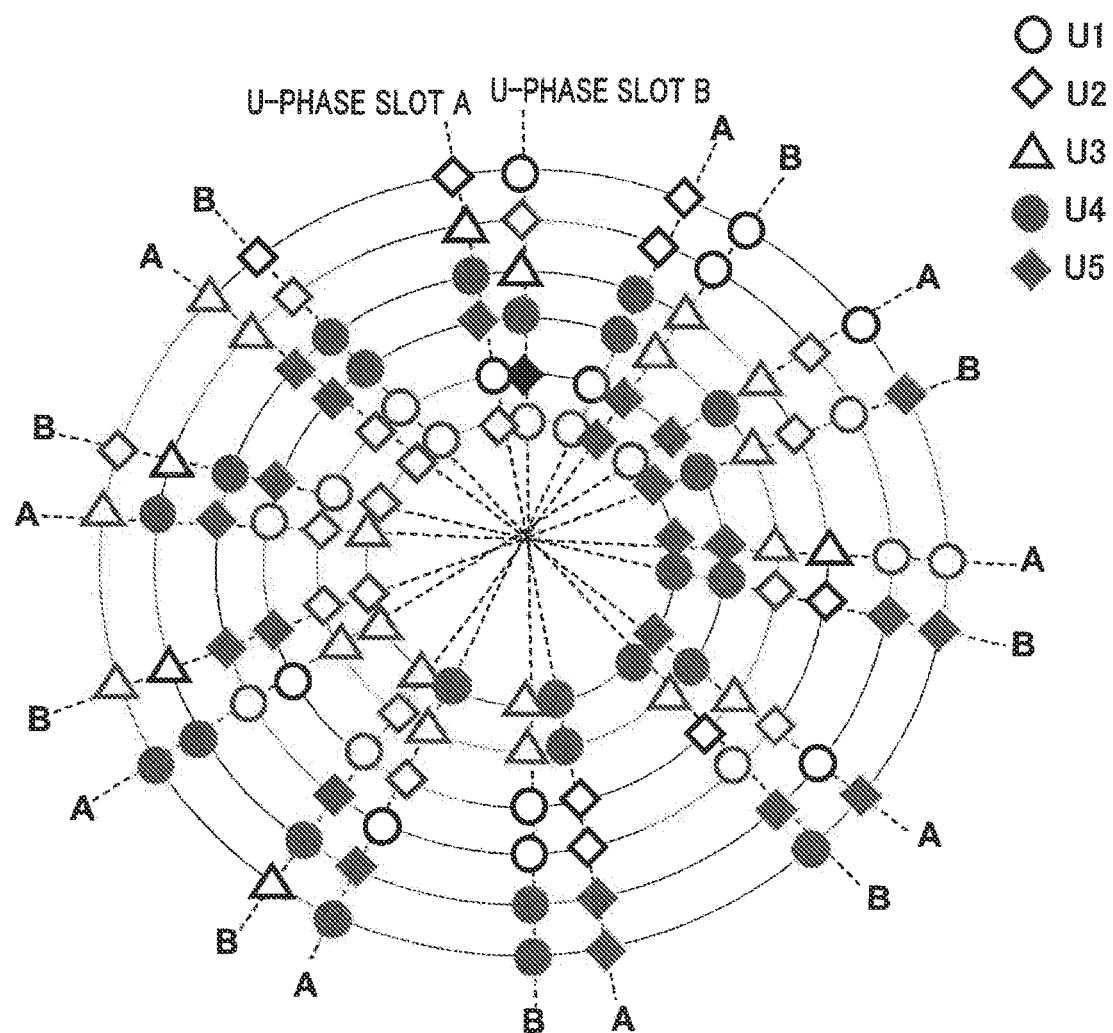
FIG. 20 is a schematic view illustrating the arrangement of the sub-windings U1-U5 of the U-phase winding in pairs of U-phase slots A and B of a stator core of the stator.

Moreover, in the present embodiment, as shown in FIGS. 20 and 21, for each of the sub-windings U1-U5 of the U-phase winding 41U, the in-slot portions 51C of the sub-winding are evenly distributed to the first to the sixth layers so that at each of the first to the sixth layers, the number of the in-slot portions 51C of the sub-winding received in the U-phase slots A and B is equal to 2×M, where M is the slot multiplier number and set to 2 in the present embodiment.

More specifically, in the present embodiment, for each of the sub-windings U1-U5 of the U-phase winding 41U, the number of the in-slot portions 51C of the sub-winding arranged at the first layer in the U-phase slots A is equal to 2; the number of the in-slot portions 51C of the sub-winding arranged at the first layer in the U-phase slots B is equal to 2; thus the total number of the in-slot portions 51C of the sub-winding arranged at the first layer in the U-phase slots A and B is equal to 4 (i.e., 2×M with M being set to 2). Similarly, the number of the in-slot portions 51C of the sub-winding arranged at the second layer in the U-phase slots A is equal to 2; the number of the in-slot portions 51C of the sub-winding arranged at the second layer in the U-phase slots B is equal to 2; thus the total number of the in-slot portions 51C of the sub-winding arranged at the second layer in the U-phase slots A and B is equal to 4. The number of the in-slot portions 51C of the sub-winding arranged at the third layer in the U-phase slots A is equal to 2; the number of the in-slot portions 51C of the sub-winding arranged at the third layer in the U-phase slots B is equal to 2; thus the total number of the in-slot portions 51C of the sub-winding arranged at the third layer in the U-phase slots A and B is equal to 4. The number of the in-slot portions 51C of the sub-winding arranged at the fourth layer in the U-phase slots A is equal to 2; the number of the in-slot portions 51C of the sub-winding arranged at the fourth layer in the U-phase slots B is equal to 2; thus the total number of the in-slot portions 51C of the sub-winding arranged at the fourth layer in the U-phase slots A and B is equal to 4. The number of the in-slot portions 51C of the sub-winding arranged at the fifth layer in the U-phase slots A is equal to 2; the number of the in-slot portions 51C of the sub-winding arranged at the fifth layer in the U-phase slots B is equal to 2; thus the total number of the in-slot portions 51C of the sub-winding arranged at the fifth layer in the U-phase slots A and B is equal to 4.

Moreover, in the present embodiment, as shown in FIG. 14, at each of the first to the sixth layers, those in-slot portions 51C of the sub-windings U1-U5 of the U-phase winding 41U which are connected with the outer apex parts 53A (i.e., the apex parts 53A of the turn portions 52A of the large electric conductor segments 50A forming the sub-windings U1-U5) are arranged alternately with those in-slot portions 51C of the sub-windings U1-U5 which are connected with the inner apex parts 53B (i.e., the apex parts 53B of the turn portions 52B of the small electric conductor segments 50B forming the sub-windings U1-U5) in the circumferential direction of the stator core 30.

Referring back to FIG. 5, in the present embodiment, for each axially-overlapping pair of the outer and inner turn portions 52A and 52B, one of the outer oblique parts 55A of the outer turn portion 52A and one of the inner oblique parts 55B of the inner turn portion 52B (i.e., the right-side outer oblique part 55A and the right-side inner oblique part 55B in FIG. 5) are in contact with each other over at least parts of the circumferential lengths thereof. In addition, the remaining part of the outer turn portion 52A which is out of contact with the inner oblique part 55B of the inner turn portion 52B is in contact with one of the inner oblique parts 55B of another inner turn portion 52B (not shown).

Figure 22:
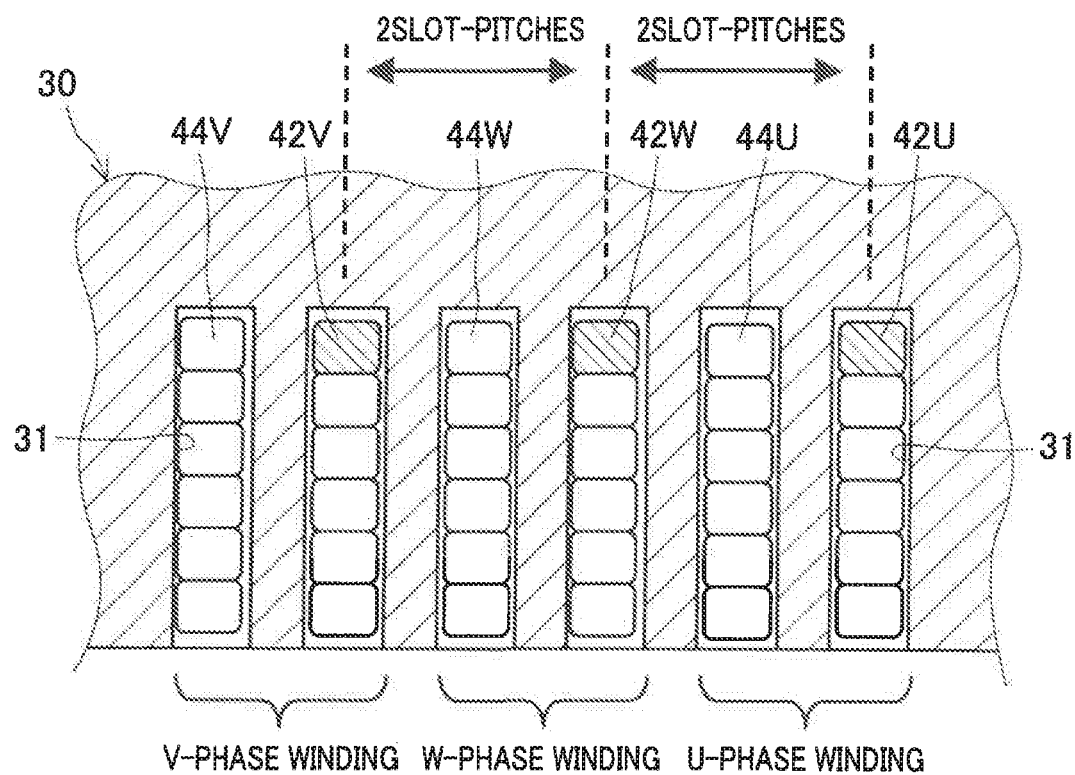
FIG. 22 is a schematic cross-sectional view illustrating the arrangement of terminal-side and neutral point-side winding sections of the sub-windings of the phase windings of the stator coil.
Figure 23:
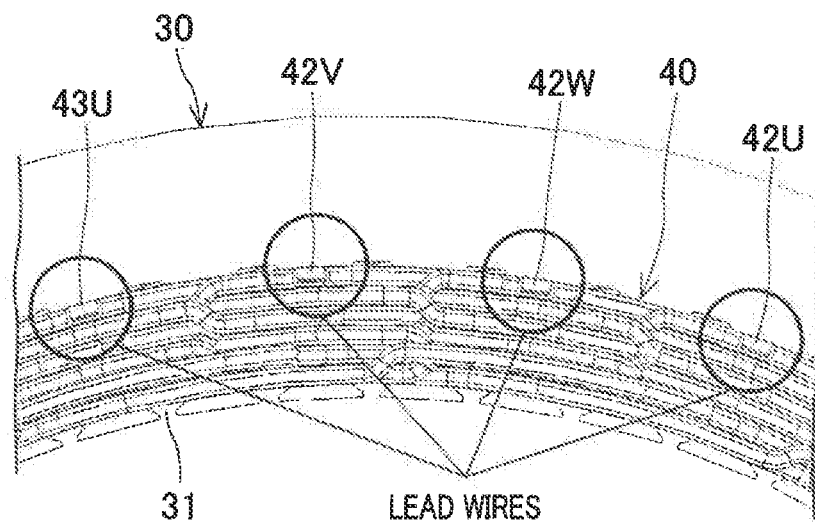
FIG. 23 is a schematic axial view illustrating the arrangement of the terminal-side and neutral point-side winding sections.

In the present embodiment, as shown in FIGS. 22 and 23, the terminal-side winding sections 42U, 42V and 42W and neutral point-side winding sections 43U, 43V and 43W of the U-phase, V-phase and W-phase windings 41U, 41V and 41W (more specifically, the terminal-side winding sections 42U1-42U5, 42V1-42V5 and 42W1-42W5 and neutral point-side winding sections 43U1-43U5, 43V1-43V5 and 43W1-43W5 of the sub-windings U1-U5, V1-V5 and W1-W5 of the U-phase, V-phase and W-phase windings 41U, 41V and 41W) of the stator coil 40 are arranged at the radially outermost layer (i.e., the sixth layer in the present embodiment) in every M slots 31 of the stator core 30, where M is the slot multiplier number and set to 2 in the present embodiment. That is, the terminal-side winding sections 42U, 42V and 42W and neutral point-side winding sections 43U, 43V and 43W of the U-phase, V-phase and W-phase windings 41U, 41V and 41W of the stator coil 40, which respectively form the terminal-side and neutral point-side lead wires of the U-phase, V-phase and W-phase windings 41U, 41V and 41W, are circumferentially spaced from one another by M slot-pitches (i.e., two slot-pitches in the present embodiment).

Figure 24:
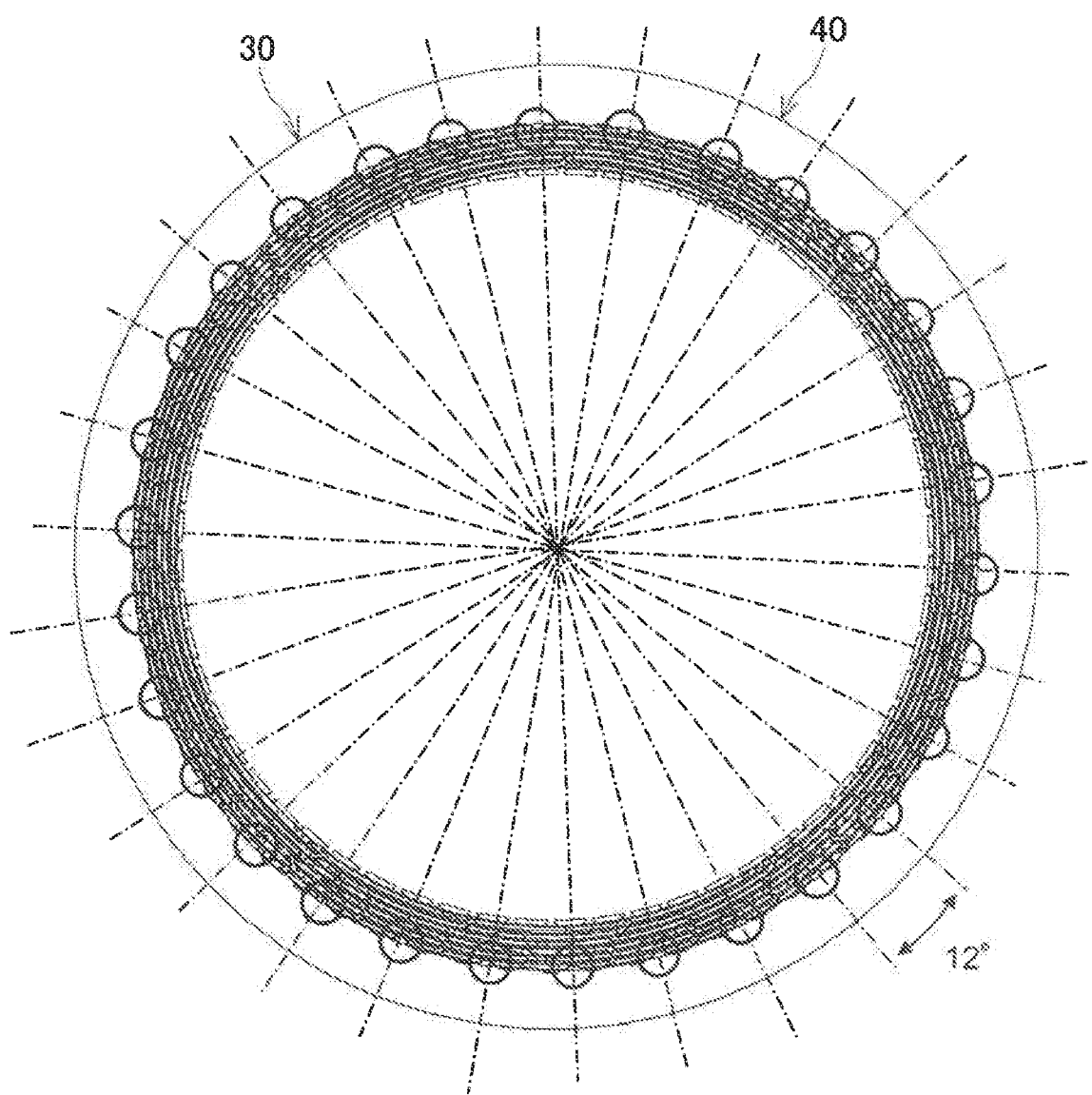
FIG. 24 is an axial end view illustrating the arrangement of the terminal-side and neutral point-side winding sections.

Moreover, in the present embodiment, the total number Q of the terminal-side winding sections 42U, 42V and 42W and neutral point-side winding sections 43U, 43V and 43W of the U-phase, V-phase and W-phase windings 41U, 41V and 41W of the stator coil 40 (or the total number Q of the terminal-side and neutral point-side lead wires of the U-phase, V-phase and W-phase windings 41U, 41V and 41W) is set to 30. Consequently, as shown in FIG. 24, the terminal-side winding sections 42U, 42V and 42W and neutral point-side winding sections 43U, 43V and 43W of the U-phase, V-phase and W-phase windings 41U, 41V and 41W of the stator coil 40 are circumferentially arranged at equal angular intervals of 12° (i.e., 360°/Q with Q being equal to 30).

Figure 25:
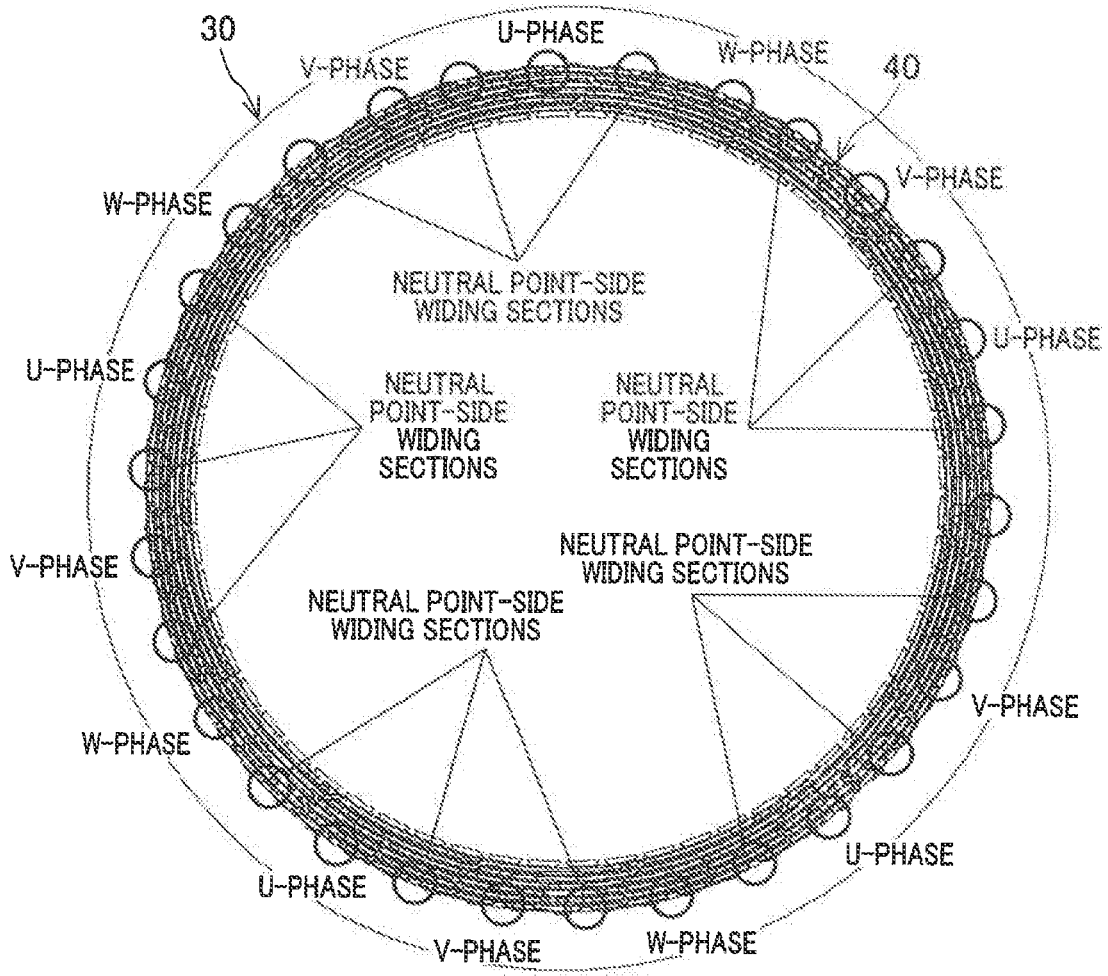
FIG. 25 is another axial end view illustrating the arrangement of the terminal-side and neutral point-side winding sections.

Furthermore, in the present embodiment, as shown in FIG. 25, each of the neutral point-side winding sections 43U, 43V and 43W of the U-phase, V-phase and W-phase windings 41U, 41V and 41W is arranged between one circumferentially-adjacent pair of the terminal-side winding sections 42U, 42V and 42W of the U-phase, V-phase and W-phase windings 41U, 41V and 41W. In other words, the neutral point-side winding sections 43U, 43V and 43W of the U-phase, V-phase and W-phase windings 41U, 41V and 41W are arranged alternately with the terminal-side winding sections 42U, 42V and 42W of the U-phase, V-phase and W-phase windings 41U, 41V and 41W in the circumferential direction of the stator core 30. Consequently, those of the terminal-side and neutral point-side lead wires of the U-phase, V-phase and W-phase windings 41U, 41V and 41W which are joined by welding to the same one of the U-phase, V-phase, W-phase and neutral busbars 61-64 are not circumferentially adjacent to each other. As a result, sufficient creepage distances are secured between electrical joints (or welds) 46 formed between the terminal-side and neutral point-side lead wires and the busbars 61-64.

In the present embodiment, the terminal-side winding sections 42U of the U-phase winding 41U (more specifically, the terminal-side winding sections 42U1-42U5 of the sub-windings U1-U5 of the U-phase winding 41U) are electrically connected to the inverter via the U-phase busbar 61. Similarly, the terminal-side winding sections 42V of the V-phase winding 41V (more specifically, the terminal-side winding sections 42V1-42V5 of the sub-windings V1-V5 of the V-phase winding 41V) are electrically connected to the inverter via the V-phase busbar 62. The terminal-side winding sections 42W of the W-phase winding 41W (more specifically, the terminal-side winding sections 42W1-42W5 of the sub-windings W1-W5 of the W-phase winding 41W) are electrically connected to the inverter via the W-phase busbar 63. Moreover, all of the neutral point-side winding sections 43U of the U-phase winding 41U (more specifically, the neutral point-side winding sections 43U1-43U5 of the sub-windings U1-U5 of the U-phase winding 41U), the neutral point-side winding sections 43V of the V-phase winding 41V (more specifically, the neutral point-side winding sections 43V1-43V5 of the sub-windings V1-V5 of the V-phase winding 41V) and the neutral point-side winding sections 43W of the W-phase winding 41W (more specifically, the neutral point-side winding sections 43W1-43W5 of the sub-windings W1-W5 of the W-phase winding 41W) are electrically connected, via the neutral busbar 64, to define the neutral point therebetween. In addition, the U-phase, V-phase, W-phase and neutral busbars 61-64 are electrically connected to those in-slot portions 51C of the U-phase, V-phase and W-phase windings 41U, 41V and 41W of the stator coil 40 which are arranged at the radially outermost layer (i.e., in the sixth layer in the present embodiment) in every M slots 31 of the stator core 30, where M is the slot multiplier number and set to 2 in the present embodiment.

Referring back to FIG. 2, in the present embodiment, each of the U-phase, V-phase, W-phase and neutral busbars 61-64 is formed of an electrically conductive material into a predetermined arc shape. Moreover, the U-phase, V-phase, W-phase and neutral busbars 61-64 are arranged above the back core 33 of the stator core 30 so as to surround the first coil end part 40a of the stator coil 40 from the radially outside.

Figure 26:
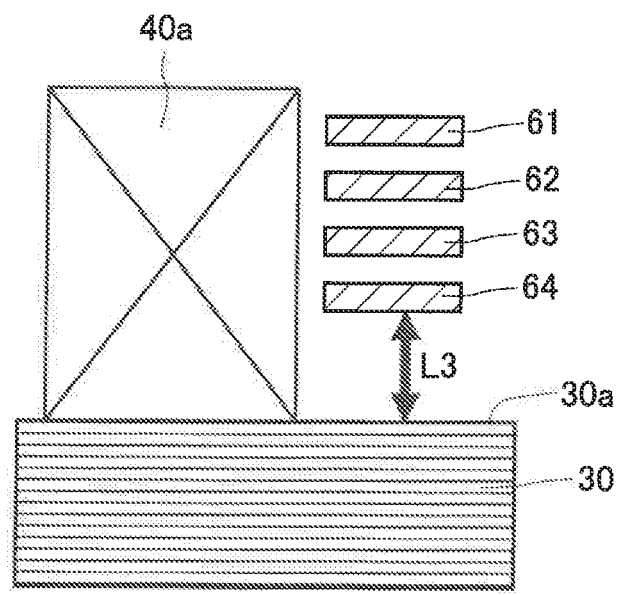
FIG. 26 is a schematic cross-sectional view illustrating the arrangement of phase and neutral busbars.

More specifically, as shown in FIG. 26, the U-phase, V-phase, W-phase and neutral busbars 61-64 are located axially outside the stator core 30 and radially outside the first coil end part 40a of the stator coil 40 which protrudes from the first axial end face 30a of the stator core 30, and arranged in axial alignment with each other. Moreover, among the four busbars 61-64, the neutral busbar 64 which has the lowest electric potential is located closest to the stator core 30. In addition, the neutral busbar 64 is located away from the first coil end face 30a of the stator core 30 by a predetermined distance L3. Consequently, it becomes possible to reduce the potential difference to ground, thereby preventing occurrence of a ground fault.

Figure 27:
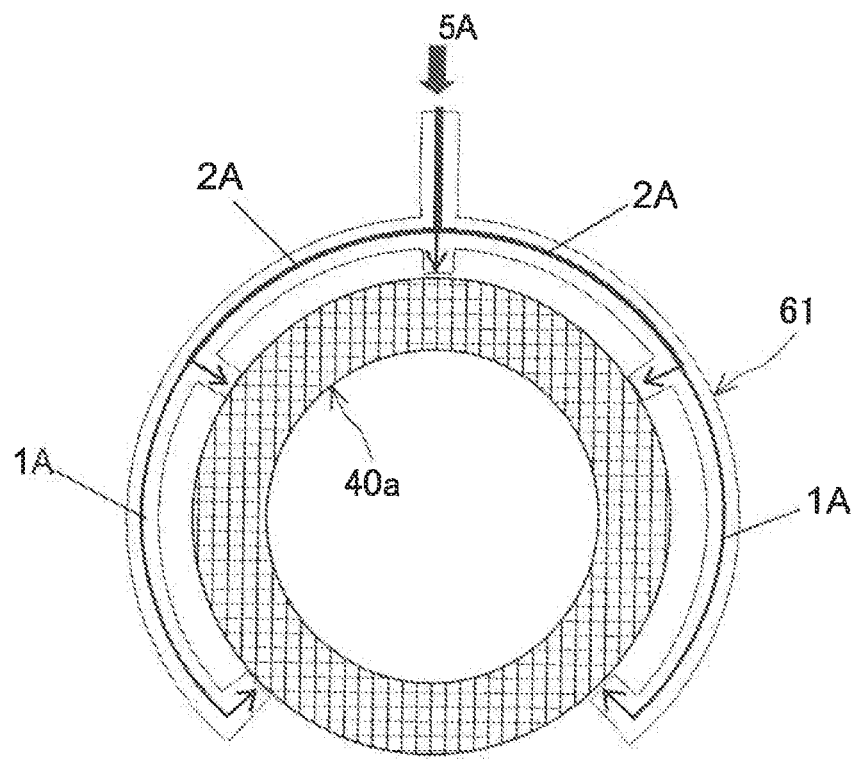
FIG. 27 is a schematic view illustrating the electric current density of the U-phase busbar.
Figure 28:
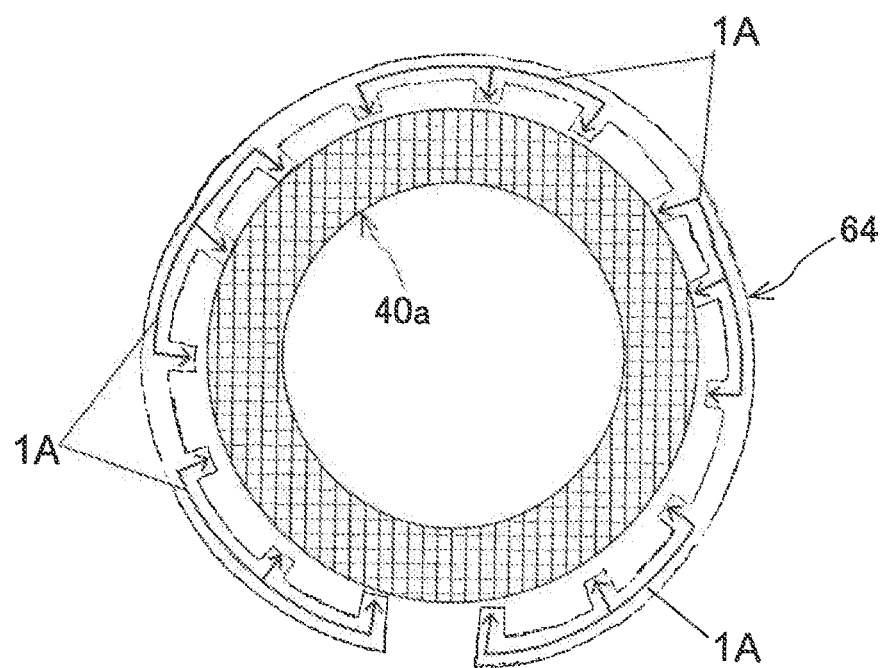
FIG. 28 is a schematic view illustrating the electric current density of the neutral busbar.

Furthermore, in the present embodiment, the neutral busbar 64 is set to have a lower electric current density than the U-phase, V-phase and W-phase busbars 61, 62 and 63. Specifically, when the input current is equal to, for example, 5 A, the maximum current flowing in the U-phase busbar 61 is equal to 2 A, as shown in FIG. 27. Similarly, though not shown in the figures, the maximum current flowing in the V-phase busbar 62 and the maximum current flowing in the W-phase busbar 63 are also equal to 2 A. In contrast, as shown in FIG. 28, the maximum current flowing in the neutral busbar 64 is equal to 1 A. Therefore, it is only necessary for the cross-sectional area of the neutral busbar 64 to be greater than 50% of the cross-sectional area of each of the U-phase, V-phase and W-phase busbars 61, 62 and 63.

Figure 29:
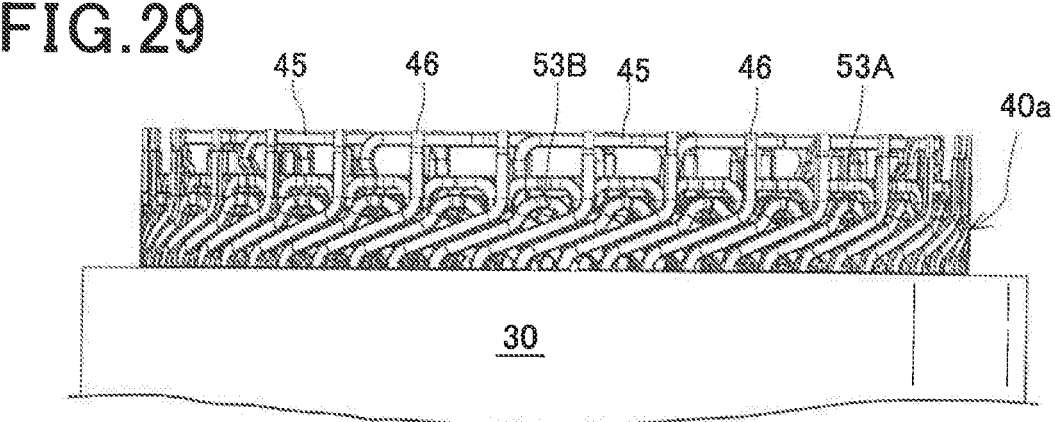
FIG. 29 is a side view of part of the stator before electrical joints are covered by a resin covering member.
Figure 30:
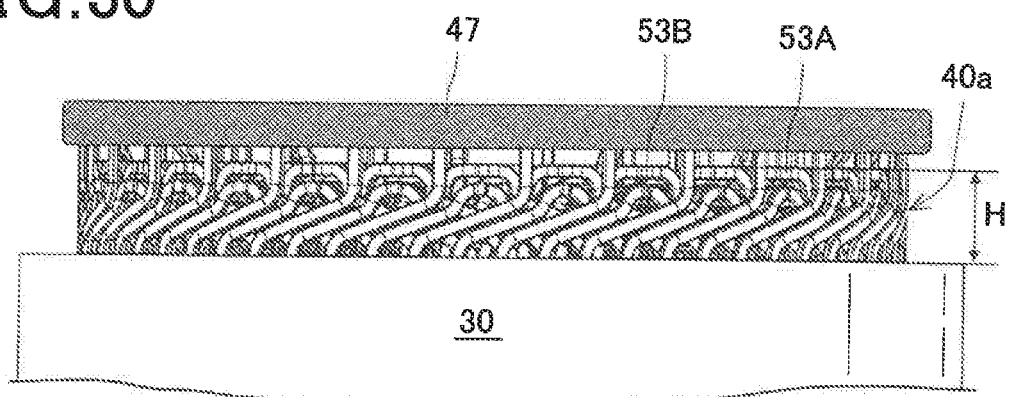
FIG. 30 is a side view of part of the stator after the electrical joints are covered by the resin covering member.

In the present embodiment, as shown in FIGS. 29 and 30, the electrical joints (or welds) 46 formed between the terminal-side winding sections 42U, 42V and 42W and neutral point-side winding sections 43U, 43V and 43W of the U-phase, V-phase and W-phase windings 41U, 41V and 41W and the U-phase, V-phase, W-phase and neutral busbars 61-64 are covered by an electrically-insulative resin covering member 47 that is formed by powder coating. The coverage range of the resin covering member 47 is set to be axially outside the axial height H of the first coil end part 40a of the stator coil 40 which protrudes from the first axial end face 30a of the stator core 30. Consequently, there is formed a space between the outer apex parts 53A of the first coil end part 40a of the stator coil 40 and the resin covering member 47.

Figure 31:
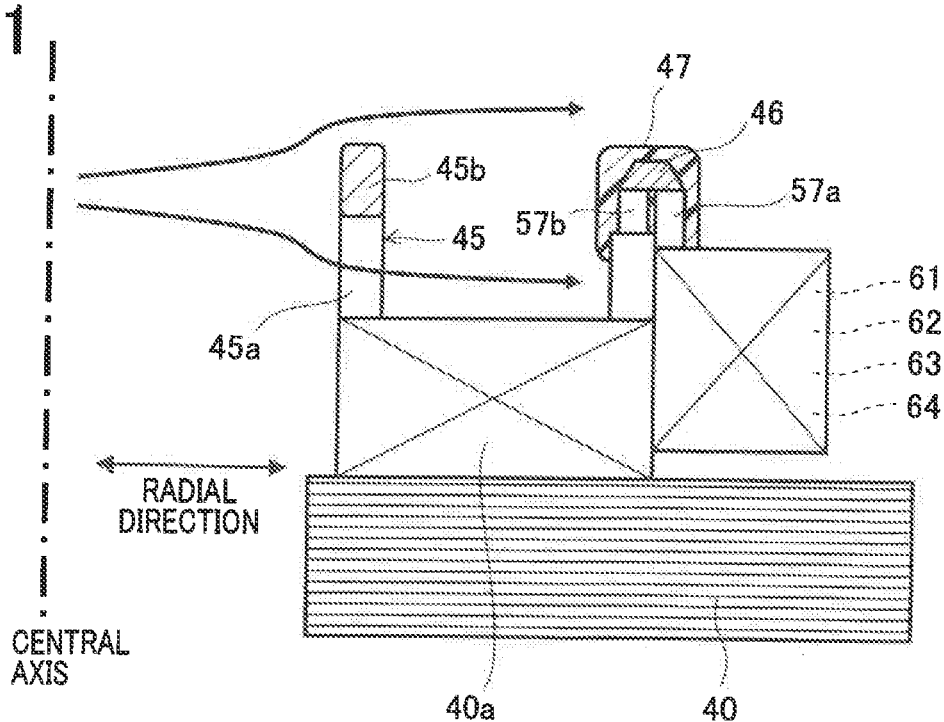
FIG. 31 is a schematic cross-sectional view illustrating the arrangement of bridging wires of the stator coil.
Figure 32:
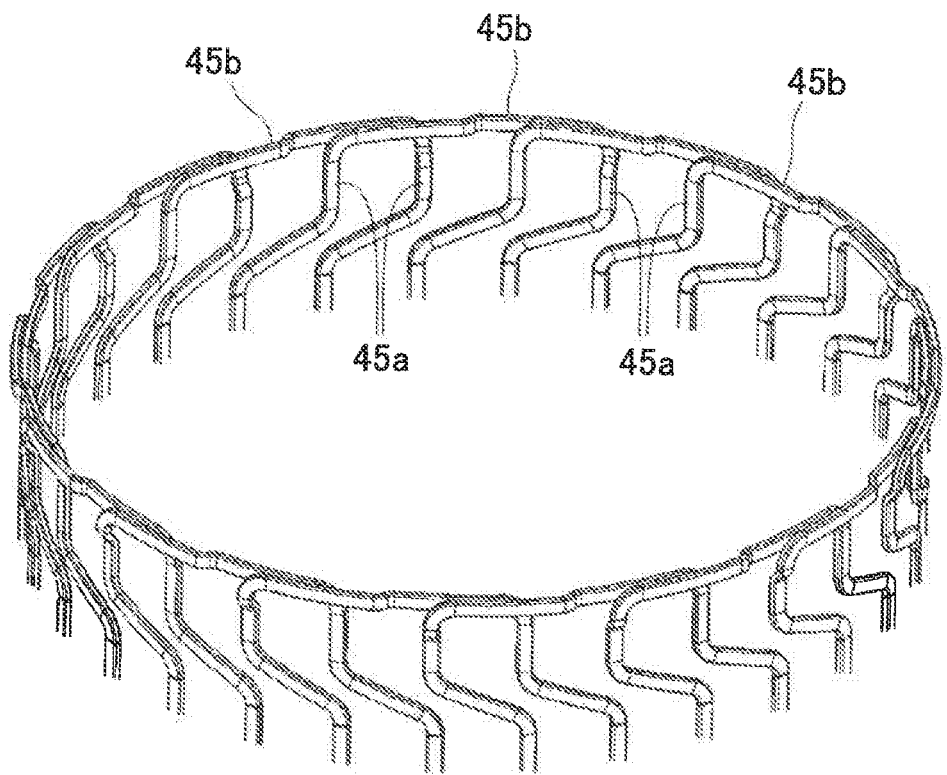
FIG. 32 is a perspective view of the bridging wires.
Figure 33:
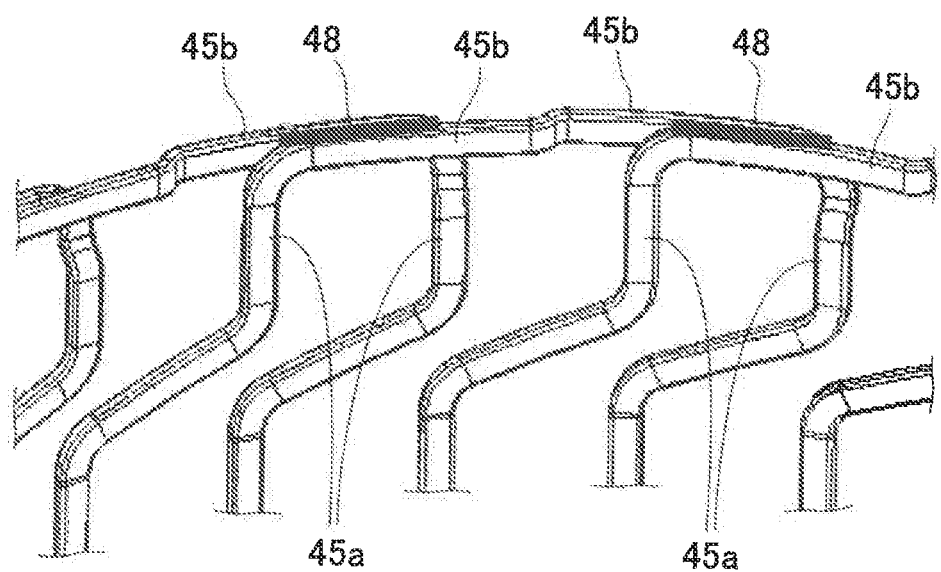
FIG. 33 is a perspective view showing part of the bridging wires through enlargement.

As shown in FIGS. 31-33, the bridging wires 45 are arranged radially inside and axially outside the first coil end part 40a of the stator coil 40; as described previously, the bridging wires 45 are provided respectively at the winding-back positions in the sub-windings U1-U5, V1-V5 and W1-W5 of the U-phase, V-phase and W-phase windings 41U, 41V and 41W of the stator coil 40. Each of the bridging wires 45 has a pair of axially-extending portions 45a and a circumferentially-extending portion 45b formed between the pair of axially-extending portions 45a. All of the bridging wires 45 are arranged so that the circumferentially-extending portions 45b of the bridging wires 45 overlap one another over the entire circumferential range of the first coil end part 40a of the stator coil 40.

Moreover, as shown in FIG. 33, each overlapping pair of the circumferentially-extending portions 45b of the bridging wires 45 are fixed together by a fixing member 48. Furthermore, as shown in FIG. 31, the circumferentially-extending portions 45b of the bridging wires 45 are located at substantially the same axial position as the electrical joints 46. In addition, each of the electrical joints 46 is formed by welding (or alternatively by crimping) at least two electric conductor wires 57a and 57b radially aligned with each other.

Each of the bridging wires 45 and the electric conductor wires 57 forming the electrical joints 46 has a substantially rectangular cross section (see FIG. 6). Moreover, a shown in FIG. 31, the bridging wires 45 and the electric conductor wires 57 are arranged so that side faces of the bridging wires 45 and the electric conductor wires 57, which correspond to the longer sides of the substantially rectangular cross sections of the bridging wires 45 and the electric conductor wires 57, face in the radial direction of the stator core 30.

Figure 34:
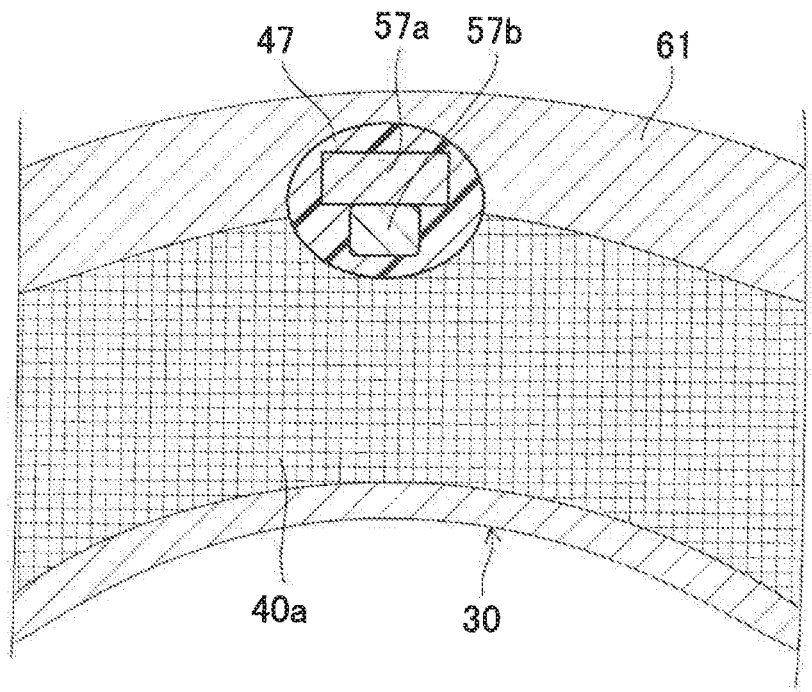
FIG. 34 is a schematic cross-sectional view illustrating the arrangement of a pair of electric conductor wires forming one electrical joint.
Figure 35:
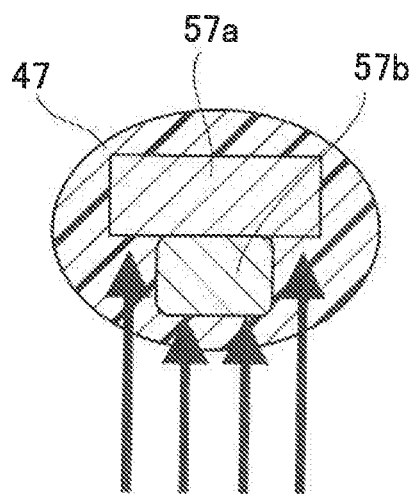
FIG. 35 is a schematic cross-sectional view showing the electrical joint of FIG. 34 through enlargement.

Furthermore, in the present embodiment, as shown in FIGS. 34 and 35, for each joined-pair of the electric conductor wires 57a and 57b, the circumferential width of the radially outer electric conductor wire 57a is set to be greater than the circumferential width of the radially inner electric conductor wire 57b. Consequently, during rotation of the rotor 14, the radially outer electric conductor wire 57a as well as the radially inner electric conductor wire 57b can be exposed to cooling air (or coolant) that flows in the centrifugal direction of the rotor 14. As a result, it becomes possible to suppress the temperature difference between the two electric conductor wires 57a and 57b, thereby reducing the thermal stress induced in the electrical joint 46 due to the temperature difference and preventing breakage of the electrical joint 46.

The above-described stator 20 according to the present embodiment has the following advantages.

In the present embodiment, the stator 20 includes the annular stator core 30, the three-phase stator coil 40, the U-phase, V-phase and W-phase busbars 61, 62 and 63, and the neutral busbar 64. The stator core 30 has the slots 31 arranged in the circumferential direction thereof. The stator coil 40 is comprised of the U-phase, V-phase and W-phase windings 41U, 41V and 41W that are distributedly wound on the stator core 30 so as to be different in electrical phase from each other. Each of the phase windings 41U-41W includes the in-slot portions 51C each of which is received in one of the slots 31 of the stator core 30. Each of the U-phase, V-phase and W-phase busbars 61, 62 and 63 is provided to electrically connect a corresponding one of the U-phase, V-phase and W-phase windings 41U, 41V and 41W to the inverter (i.e., an external electrical device). The neutral busbar 64 is provided to star-connect the phase windings 41U-41W of the stator coil 40 to define the neutral point therebetween. In each of the slots 31 of the stator core 30, there are arranged K of the in-slot portions 51C of the phase windings 41U-41W of the stator coil 40 in K layers so as to be radially aligned with each other, where K is an even number and set to 6 in the present embodiment. The number of the slots 31 formed in the stator core 30 per magnetic pole of the rotor 14 and per phase of the stator coil 40 is set to M, where M is a natural number greater than or equal to 2 and set to 2 in the present embodiment. Each of the phase windings 41U-41W of the stator coil 40 is comprised of the sub-windings U1-U5, V1-V5 or W1-W5 that are connected parallel to each other. For each of the sub-windings, the in-slot portion 51C of the sub-winding which is arranged at the Nth layer in one of the slots 31 of the stator core 30 is electrically connected with the in-slot portion 51C of the sub-winding which is arranged at the (N+1)th layer in another one of the slots 31, where N is an arbitrary natural number greater than or equal to 1 and less than K (i.e., less than 6 in the present embodiment). The U-phase, V-phase, W-phase and neutral busbars 61-64 are electrically connected with those in-slot portions 51C of the phase windings 41U-41W of the stator coil 40 which are arranged at the radially outermost layer (i.e., in the sixth layer in the present embodiment) in the respective slots 31 of the stator core 30 so as to be circumferentially spaced from one another by M slot-pitches or more (more particularly, by two slot-pitches in the present embodiment; see FIG. 22).

With the above configuration, it becomes possible to arrange the electrical joints 46 formed between the U-phase, V-phase and neutral busbars 61-64 and the phase windings 41U-41W of the stator coil 40 so as to be circumferentially spaced from one another by M slot-pitches or more. Consequently, it becomes possible to secure sufficient creepage distances between the electrical joints 46, thereby preventing creeping discharge from occurring therebetween. As a result, it becomes possible to improve the insulation properties of the stator 20.

Moreover, in the present embodiment, each of the sub-windings U1-U5, V1-V5 and W1-W5 of the phase windings 41U-41W of the stator coil 40 includes the terminal-side winding section 42U, 42V or 42W electrically connected with a corresponding one of the U-phase, V-phase and W-phase busbars 61-63, the neutral point-side winding section 43U, 43V or 43W electrically connected with the neural busbar 64, and the main winding section 44U, 44V or 44W between the terminal-side and neutral point-side winding sections. All of the terminal-side and neutral point-side winding sections 42U-42W and 43U-43W of the sub-windings U1-U5, V1-V5 and W1-W5 of the phase windings 41U-41W are circumferentially arranged at equal angular intervals of 360°/Q, where Q is the total number of the terminal-side and neutral point-side winding sections 42U-42W and 43U-43W of the sub-windings U1-U5, V1-V5 and W1-W5 of the phase windings 41U-41W and set to 30 in the present embodiment. That is, all of the terminal-side and neutral point-side lead wires of the sub-windings U1-U5, V1-V5 and W1-W5 of the phase windings 41U-41W are circumferential spaced from one another at equal angular intervals of 360°/Q (i.e., 12° in the present embodiment; see FIG. 24).

With the above arrangement, it becomes possible to more reliably secure sufficient creepage distances between the electrical joints 46 that are formed between the terminal-side and neutral point-side lead wires of the sub-windings U1-U5, V1-V5 and W1-W5 of the phase windings 41U-41W and the U-phase, V-phase, W-phase and neutral busbars 61-64. As a result, it becomes possible to more reliably prevent creeping discharge from occurring between the electrical joints 46.

In the present embodiment, each of the neutral point-side winding sections 43U-43W of the sub-windings U1-U5, V1-V5 and W1-W5 of the phase windings 41U-41W is arranged between one circumferentially-adjacent pair of the terminal-side winding sections 42U-42W of the sub-windings U1-U5, V1-V5 and W1-W5 of the phase windings 41U-41W (see FIG. 25).

With the above arrangement, it becomes possible to interpose, between each pair of those electrical joints 46 which are formed between the terminal-side winding sections 42U-42W and the U-phase, V-phase and W-phase busbars 61-63 and thus have a higher electric potential, one of those electrical joints 46 which are formed between the neutral point-side winding sections 43U-43W and the neutral busbar 64 and thus have a lower electric potential. Consequently, it becomes possible to more reliably secure sufficient creepage distances between the electrical joints 46, thereby more reliably preventing creeping discharge from occurring therebetween.

In the present embodiment, the electrical joints 46 formed between the terminal-side and neutral point-side winding sections 42U-42W and 43U-43W of the sub-windings U1-U5, V1-V5 and W1-W5 of the phase windings 41U-41W and the U-phase, V-phase, W-phase and neutral busbars 61-64 are covered by the electrically-insulative resin covering member 47. The stator coil 40 has the first coil end part 40a protruding from the first axial end face 30a of the stator core 30. The coverage range of the resin covering member 47 is axially outside the first coil end part 40a of the stator coil 40 (see FIGS. 30-31).

With the above configuration, it becomes possible to prevent the creepage distances between the electrical joints 46 from being short-circuited due to adherence of the resin covering member 47 to the first coil end part 40a of the stator coil 40. Consequently, it becomes possible to more reliably prevent creeping discharge from occurring between the electrical joints 46.

In the present embodiment, the electrical joints 46 are located axially outside the first coil end part 40a of the stator coil 40. The stator coil 40 includes the bridging wires 45 each of which electrically connects one pair of the in-slot portions 51C of the phase windings 41U-41W of the stator coil 40 respectively received in two different ones of the slots 31 of the stator core 30. The bridging wires 45 are located axially outside the first coil end part 40a of the stator coil 40 and radially inside the electrical joints 46 (see FIG. 31). Each of the bridging wires 45 has the pair of axially-extending portions 45a and the circumferentially-extending portion 45b between the pair of axially-extending portions 45a. The bridging wires 45 are arranged so that the circumferentially-extending portions 45b of the bridging wires 45 overlap one another over the entire circumferential range of the first coil end part 40a of the stator coil 40 (see FIG. 32).

With the above arrangement, during rotation of the rotor 14, cooling air (or coolant) that flows in the centrifugal direction of the rotor 14 is blocked by the bridging wires 45; thus, the electrical joints 46 are prevented from being directly exposed to the flow of the cooling air. Consequently, it becomes possible to reduce thermal stress induced by uneven temperature in the electrical joints 46, thereby preventing breakage of the electrical joints 46. As a result, it becomes possible to improve the insulation properties of the stator 20.

In the present embodiment, the circumferentially-extending portions 45b of the bridging wires 45 are located at substantially the same axial position as the electrical joints 46 (see FIG. 31).

With the above arrangement, it becomes possible for the bridging wires 45 to more effectively block the cooling air, thereby more reliably preventing the electrical joints 46 from being directly exposed to the flow of the cooling air.

In the present embodiment, each of the bridging wires 45 has the substantially rectangular cross section and is arranged so that the pair of side faces of the bridging wire 45, which correspond to the longer sides of the substantially rectangular cross sections, face in the radial direction of the stator core 30 (see FIG. 31).

With the above arrangement, it becomes possible to increase the cooling air-blocking area of the bridging wires 45, thereby more reliably preventing the electrical joints 46 from being directly exposed to the flow of the cooling air.

In the present embodiment, each of the electrical joints 46 is formed, by welding or crimping, between one pair of the electric conductor wires 57a and 57b radially aligned with each other. The circumferential width of the radially outer electric conductor wire 57a is set to be greater than the circumferential width of the radially inner electric conductor wire 57b (see FIGS. 34-35).

With the above configuration, the radially outer electric conductor wire 57a as well as the radially inner electric conductor wire 57b can be exposed to the flow of the cooling air. Consequently, it becomes possible to suppress the temperature difference between the two electric conductor wires 57a and 57b, thereby reducing the thermal stress induced in the electrical joint 46 due to the temperature difference and preventing breakage of the electrical joint 46. As a result, it becomes possible to improve the insulation properties of the stator 20.

In the present embodiment, each overlapping pair of the circumferentially-extending portions 45b of the bridging wires 45 are fixed together by the fixing member 48 (see FIG. 33).

With the above configuration, it becomes possible to increase the strength of the bridging wires 45 against the flow of the cooling air, thereby reliably preventing the bridging wires 45 from being deformed or even damaged by the flow of the cooling air. Consequently, it becomes possible for the bridging wires 45 to more reliably block the cooling air, thereby more reliably preventing the electrical joints 46 from being directly exposed to the flow of the cooling air.

In the present embodiment, the U-phase, V-phase, W-phase and neutral busbars 61-64 are located axially outside the stator core 30 and radially outside the first coil end part 40a of the stator coil 40. Moreover, the U-phase, V-phase, W-phase and neutral busbars 61-64 are arranged in axial alignment with each other. Among the U-phase, V-phase, W-phase and neutral busbars 61-64, the neutral busbar 64, which has the lowest electric potential, is located closest to the stator core 30 (see FIG. 26).

With the above arrangement, it becomes possible to reduce the potential difference to ground, thereby preventing occurrence of a ground fault. As a result, it becomes possible to improve the insulation properties of the stator 20.

In the present embodiment, the neutral busbar 64 is set to have a lower electric current density than the U-phase, V-phase and W-phase busbars 61, 62 and 63.

In general, with increase in the ambient temperature, it becomes easier for electrical discharge to occur in the stator 20 and for the insulation properties of the stator 20 to be lowered due to thermal deterioration of the insulating members such as the resin covering member 47. However, by arranging the neutral busbar 64 to be closest to the stator core 30 and lowering the electric current density of the neutral busbar 64, it is still possible to reliably prevent occurrence of electrical discharge to the stator core 30 (or to ground). As a result, it is still possible to reliably ensure the insulation properties of the stator 20.

Second Embodiment

A stator 20A according to a second embodiment has almost the same structure as the stator 20 according to the first embodiment. Accordingly, only the differences therebetween will be described hereinafter.

Figure 36:
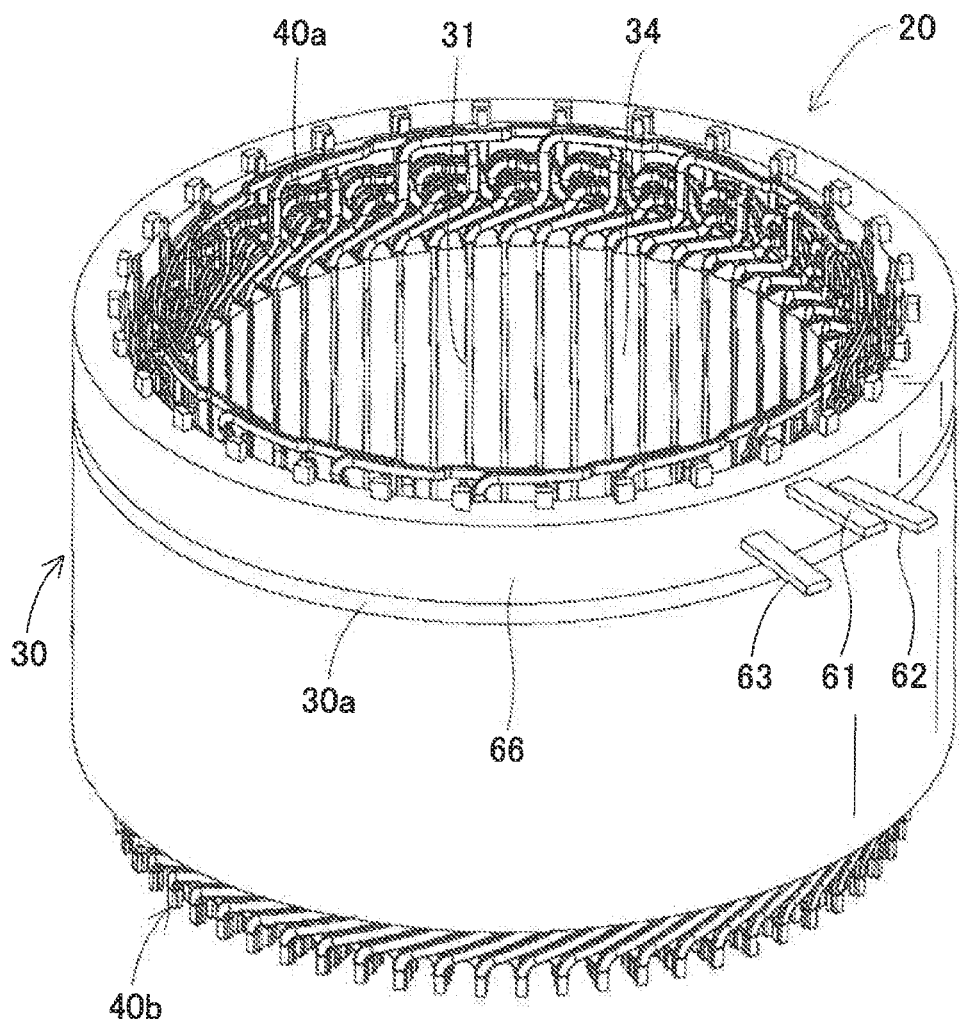
FIG. 36 is a perspective view of a stator according to a second embodiment.
Figure 37:
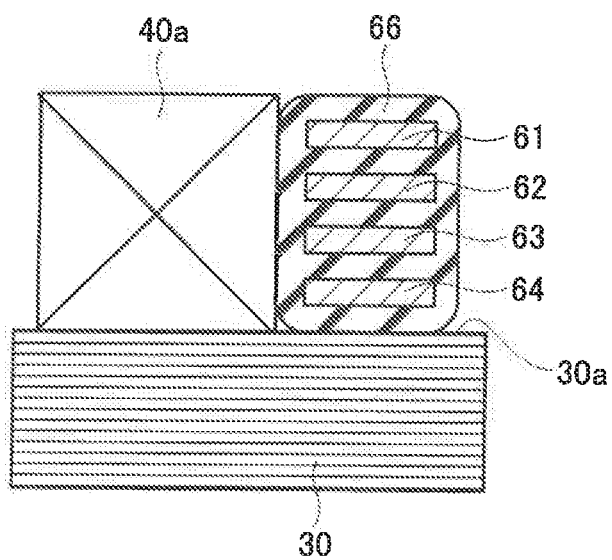
FIG. 37 is a schematic cross-sectional view illustrating the integration of busbars by a resin member in the stator according to the second embodiment.

As shown in FIGS. 36 and 37, in the stator 20A according to the present embodiment, the U-phase, V-phase, W-phase and neutral busbars 61-64 are integrated by a resin member 66 into one piece. In other words, the U-phase, V-phase, W-phase and neutral busbars 61-64 and the resin member 66 together form one integrated body.

In addition, as in the first embodiment, the U-phase, V-phase, W-phase and neutral busbars 61-64 are located axially outside the stator core 30 and radially outside the first coil end part 40a of the stator coil 40. The U-phase, V-phase, W-phase and neutral busbars 61-64 are axially aligned with each other. Among the U-phase, V-phase, W-phase and neutral busbars 61-64, the neutral busbar 64, which has the lowest electric potential, is located closest to the stator core 30.

In the present embodiment, the resin member 66 is formed, by resin molding, so as to cover the surfaces of the U-phase, V-phase, W-phase and neutral busbars 61-64 that are arranged in axial alignment with each other. The resin member 66 has a cross section whose outline is substantially rectangular in shape. The resin member 66 is arranged, together with the U-phase, V-phase, W-phase and neutral busbars 61-64 embedded therein, so that a side surface of the resin member 66 abuts the first axial end face 30a of the stator core 30.

With the above arrangement, a ground fault (or electrical discharge to ground) may occur between the busbars 61-64 and the stator core 30 through voids and/or cracks formed in the resin member 66. However, as described above, in the present embodiment, among the busbars 61-64, the neutral busbar 64, which has the lowest electric potential, is located closest to the stator core 30. Consequently, it is still possible to reliably prevent a ground fault from occurring between the side surface of the resin member 66 and the first axial end face 30a of the stator core 30.

The stator 20A according to the present embodiment has the same advantages as the stator 20 according to the first embodiment.

Moreover, in the present embodiment, since the U-phase, V-phase, W-phase and neutral busbars 61-64 are integrated by the resin member 66 into one piece, the mechanical strength and the resistance to vibration of the stator 20A is enhanced. In addition, with the U-phase, V-phase, W-phase and neutral busbars 61-64 embedded in the resin member 66, the insulation properties of the stator 20A is also improved.

[First Modification]

Figure 38:
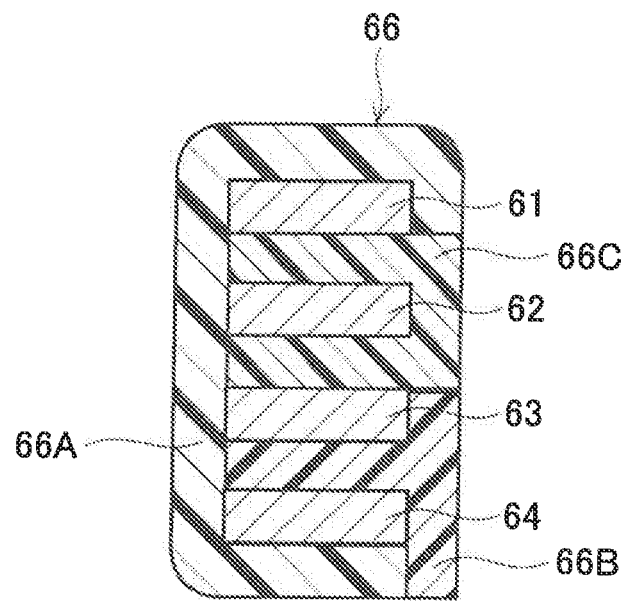
FIG. 38 is a cross-sectional view illustrating a first modification of the second embodiment.

In this modification, as shown in FIG. 38, the resin member 66 is formed by multi-phase (or multi-shot) molding to include three segments 66A, 66B and 66B.

Moreover, a boundary between the segments 66A and 66B of the resin member 66 is located on that side surface of the resin member 66 which faces and abuts the first axial end face 30a of the stator core 30.

With the above arrangement, a ground fault may occur between the busbars 61-64 and the stator core 30 through the boundary between the segments 66A and 66B of the resin member 66. However, in the present modification, among the busbars 61-64, the neutral busbar 64, which has the lowest electric potential, is located closest to the stator core 30. Consequently, though the boundary between the segments 66A and 66B of the resin member 66 is located on the side surface of the resin member 66, it is still possible to reliably prevent a ground fault from occurring between the busbars 61-64 and the stator core 30.

[Second Modification]

Figure 39:
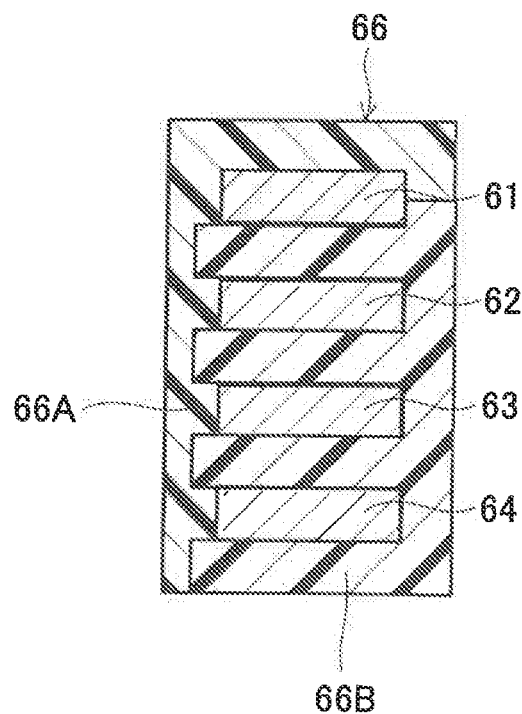
FIG. 39 is a cross-sectional view illustrating a second modification of the second embodiment.

In this modification, as shown in FIG. 39, the resin member 66 is formed by assembling a pair of segments 66A and 66B to each other.

Moreover, a boundary between the segments 66A and 66B of the resin member 66 is located on that side surface of the resin member 66 which faces and abuts the first axial end face 30a of the stator core 30.

With the above arrangement, a ground fault may occur between the busbars 61-64 and the stator core 30 through the boundary between the segments 66A and 66B of the resin member 66. However, in the present modification, among the busbars 61-64, the neutral busbar 64, which has the lowest electric potential, is located closest to the stator core 30. Consequently, though the boundary between the segments 66A and 66B of the resin member 66 is located on the side surface of the resin member 66, it is still possible to reliably prevent a ground fault from occurring between the busbars 61-64 and the stator core 30.

[Third Modification]

Figure 40:
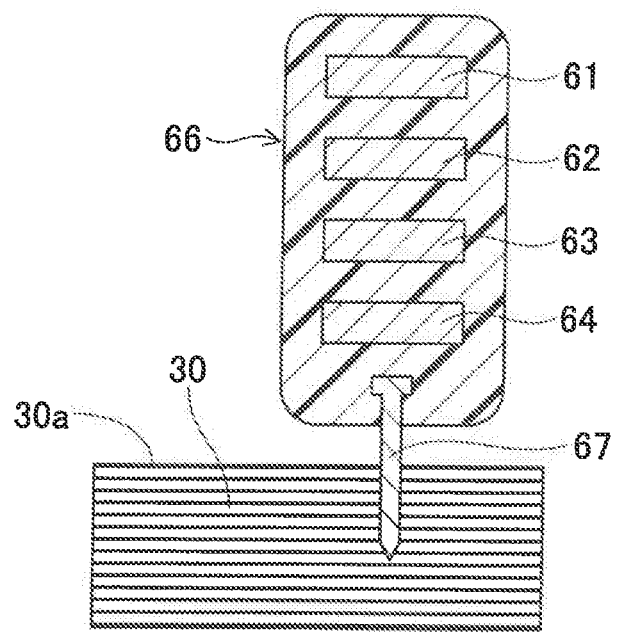
FIG. 40 is a cross-sectional view illustrating a third modification of the second embodiment.

In this modification, as shown in FIG. 40, the resin member 66 is fixed to the first axial end face 30a of the stator core 30 by a metal pin (or metal member) 67. The metal pin 67 is partially embedded in the resin member 66 during the resin molding of the resin member 66 and press-fitted into a hole formed in the first axial end face 40a of the stator core 40.

With the above arrangement, a ground fault may occur between the busbars 61-64 and the stator core 30 through the metal pin 67. However, in the present modification, among the busbars 61-64, the neutral busbar 64, which has the lowest electric potential, is located closest to the stator core 30. Consequently, through there is the metal pin 67 bridging the resin member 66 and the stator core 30, it is still possible to reliably prevent a ground fault from occurring between the busbars 61-64 and the stator core 30.

[Fourth Modification]

Figure 41:
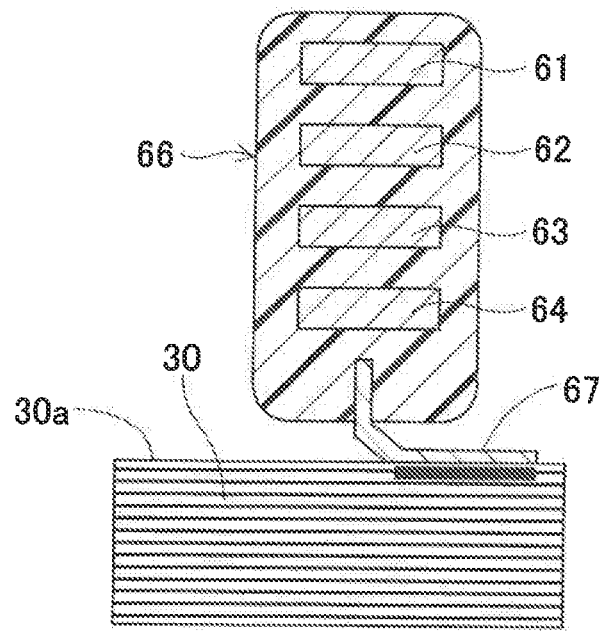
FIG. 41 is a cross-sectional view illustrating a fourth modification of the second embodiment.

In this modification, as shown in FIG. 41, the resin member 66 is fixed to the first axial end face 30a of the stator core 30 by a metal plate (or metal member) 67. The metal plate 67 is partially embedded in the resin member 66 during the resin molding of the resin member 66 and welded to the first axial end face 40a of the stator core 40.

With the above arrangement, a ground fault may occur between the busbars 61-64 and the stator core 30 through the metal plate 67. However, in the present modification, among the busbars 61-64, the neutral busbar 64, which has the lowest electric potential, is located closest to the stator core 30. Consequently, through there is the metal plate 67 bridging the resin member 66 and the stator core 30, it is still possible to reliably prevent a ground fault from occurring between the busbars 61-64 and the stator core 30.

While the above particular embodiments and their modifications have been shown and described, it will be understood by those skilled in the art that the present invention can also be embodied in various other modes without departing from the spirit of the present invention.

For example, in the above-described embodiments, all of the terminal-side and neutral point-side lead wires of the phase windings 41U-41W of the stator coil 40 are respectively led from those in-slot portions 51C of the phase windings 41U-41W which are arranged at the radially outermost layer (i.e., in the sixth layer in the above-described embodiments) in the respective slots 31 of the stator core 30 so as to be circumferentially spaced from one another by M slot-pitches or more. That is, the U-phase, V-phase, W-phase and neutral busbars 61-64 are electrically connected with those in-slot portions 51C of the phase windings 41U-41W which are arranged at the radially outermost layer in the respective slots 31 of the stator core 30 so as to be circumferentially spaced from one another by M slot-pitches or more.

However, all of the terminal-side and neutral point-side lead wires of the phase windings 41U-41W of the stator coil 40 may be respectively led from those in-slot portions 51C of the phase windings 41U-41W which are arranged at the radially innermost layer (i.e., in the first layer in the above-described embodiments) in the respective slots 31 of the stator core 30 so as to be circumferentially spaced from one another by M slot-pitches or more. That is, the U-phase, V-phase, W-phase and neutral busbars 61-64 may be electrically connected with those in-slot portions 51C of the phase windings 41U-41W which are arranged at the radially innermost layer in the respective slots 31 of the stator core 30 so as to be circumferentially spaced from one another by M slot-pitches or more.

In the above-described embodiments, the stator coil 40 is distributedly wave-wound on the stator core 30. However, the stator coil 40 may also be distributedly lap-wound on the stator core 30.

In the above-described embodiments, the present invention is directed to the stator 20 or 20A of the rotating electric machine 1 that is designed to be used in a motor vehicle as an electric motor. However, the present invention can also be applied to stators of other rotating electric machines, such as a stator of an electric generator or a stator of a motor-generator that can selectively function either as an electric motor or as an electric generator.

What is claimed is:

1. A stator for a rotating electric machine, the stator comprising:
    an annular stator core having a plurality of slots arranged in a circumferential direction thereof;
    a three-phase stator coil comprised of three phase windings that are mounted on the stator core so as to be different in electrical phase from each other;
    a plurality of phase connecting members each of which is provided to electrically connect a corresponding one of the phase windings of the stator coil to an external electrical device; and
    a neutral connecting member provided to star-connect the phase windings of the stator coil to define a neutral point therebetween,
    wherein
    the stator coil has an annular coil end part protruding from an axial end face of the stator core,
    the phase and neutral connecting members are located axially outside the stator core and radially outside the coil end part of the stator coil,
    the phase and neutral connecting members are arranged in axial alignment with each other, and
    among the phase and neutral connecting members, the neutral connecting member is located closest to the stator core.

2. The stator as set forth in claim 1, wherein the phase and neutral connecting members are integrated by a resin member into one piece, and
    the resin member is arranged in abutment with the axial end face of the stator core.

3. The stator as set forth in claim 2, wherein the resin member is comprised of a plurality of segments, and
    a boundary between one pair of the segments is located on a side surface of the resin member, the side surface facing and abutting the axial end face of the stator core.

4. The stator as set forth in claim 2, wherein the resin member is fixed to the axial end face of the stator core by a metal member that is partially embedded in the resin member.

5. The stator as set forth in claim 1, wherein the neutral connecting member is set to have a lower electric current density than the phase connecting members.

* * * * *